(12) United States Patent
Kishiro et al.

(10) Patent No.: US 9,519,306 B2
(45) Date of Patent: Dec. 13, 2016

(54) DISTRIBUTION DEVICE, DISTRIBUTION SYSTEM, AND DISTRIBUTION METHOD

(71) Applicant: FUJI ELECTRIC CO., LTD., Kawasaki-shi (JP)

(72) Inventors: Masami Kishiro, Hino (JP); Keizo Murakami, Hachioji (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/822,724

(22) Filed: Aug. 10, 2015

(65) Prior Publication Data

US 2015/0346760 A1 Dec. 3, 2015

Related U.S. Application Data

(63) Continuation of application No. PCT/JP2014/061328, filed on Apr. 22, 2014.

(30) Foreign Application Priority Data

Jun. 12, 2013 (JP) ................................ 2013-123863

(51) Int. Cl.
*G06F 1/08* (2006.01)
*G06F 1/10* (2006.01)
(Continued)

(52) U.S. Cl.
CPC . *G06F 1/08* (2013.01); *G06F 1/10* (2013.01); *G06F 1/12* (2013.01); *G06F 1/14* (2013.01);
(Continued)

(58) Field of Classification Search
CPC ............... G06F 1/10; G06F 1/12; G06F 1/14; G06F 1/04; G06F 1/08; H04J 3/0661; H04J 3/0658; H04J 3/0644; H04J 3/065; H04J 3/0667; H04Q 9/04
See application file for complete search history.

(56) References Cited

U.S. PATENT DOCUMENTS

| | | | | |
|---|---|---|---|---|
| 8,073,976 B2* | 12/2011 | Marucheck | ............... | G06F 1/14 709/223 |
| 2003/0103486 A1* | 6/2003 | Salt | .......................... | G06F 1/14 370/350 |

(Continued)

FOREIGN PATENT DOCUMENTS

| JP | H11-212926 A | 8/1999 |
|---|---|---|
| JP | 2002-031693 A | 1/2002 |

(Continued)

OTHER PUBLICATIONS

Satoru Sakaue et al, "Applied MEMS Micro-vibration Sensors and Structural Health Monitoring", Fuji Electric Journal, vol. 84, No. 4, 2011, pp. 269 to 273. Relevance can be gleaned from the present specification on p. 2-3.

(Continued)

*Primary Examiner* — Dennis M Butler
(74) *Attorney, Agent, or Firm* — Rabin & Berdo, P.C.

(57) ABSTRACT

Provided is distribution device that distributes time information to at least one sensor device, the distribution device including a storage unit that stores a time adjustment amount to be used for adjusting a local time, a calculation unit that calculates a time difference between a reference time and the local time, an adjustment unit that calculates an adjusted local time by adjusting the local time by an amount equal to or less than the time adjustment amount, when the time difference is greater than the time adjustment amount, and a distribution unit that distributes time information of the adjusted local time to the sensor device.

20 Claims, 22 Drawing Sheets

(51) Int. Cl.
*G06F 1/14* (2006.01)
*G06F 1/12* (2006.01)
*H04J 3/06* (2006.01)
*H04Q 9/04* (2006.01)
*G04G 5/00* (2013.01)

(52) U.S. Cl.
CPC ............... *H04J 3/0661* (2013.01); *H04Q 9/04* (2013.01); *G04G 5/00* (2013.01); *H04J 3/0667* (2013.01)

(56) References Cited

U.S. PATENT DOCUMENTS

2013/0212420 A1* 8/2013 Lawson ............. G05B 19/4185 713/400
2014/0068315 A1* 3/2014 Aweya ...................... G06F 1/04 713/503

FOREIGN PATENT DOCUMENTS

| | | | |
|---|---|---|---|
| JP | 2003-110562 A | 4/2003 | |
| JP | 2006-349364 | * 12/2006 | ............... G06F 1/14 |
| JP | 2006-349364 A | 12/2006 | |
| JP | 2007-018211 A | 1/2007 | |
| JP | 2007-263753 A | 10/2007 | |
| JP | 2010-278546 A | 12/2010 | |
| JP | 2011-214937 A | 10/2011 | |
| JP | 2012-202897 A | 10/2012 | |
| JP | 2012-211881 A | 11/2012 | |
| JP | 2013-096974 A | 5/2013 | |

OTHER PUBLICATIONS

Makoto Suzuki et al, "Research Trends in Wireless Sensor Network Time Synchronization Technology", Morikawa Laboratory, Technical Research Report No. 2008001, Apr. 24, 2008. Relevance can be gleaned from the present specification on p. 2-3.

"The Institute of Electronics, Information and Communication Engineers (Knowledge Base)", Institute of Electronics, Information and Communication Engineers, 2010. Relevance can be gleaned from the present specification on p. 2-3.

Shoji Yoshida et al, "Development of Real-time Ethernet (registered trademark) Optical Transmission to Provide with Sampling Synchronization by IEEE1588", The Institute of Electrical Engineers of Japan, Aug. 31, 2010. Relevance can be gleaned from the present specification on p. 2-3.

* cited by examiner

FIG. 19

| PARAMETER | UNIT | VALUE (EXAMPLE) |
|---|---|---|
| A1 | [s] | −0.001 |
| A2 | [s] | +0.001 |
| B1 | [s] | −0.0002 |
| B2 | [s] | +0.0002 |
| x1 | [ppm] | −100 |
| x2 | [ppm] | +100 |
| T | [s] | 2 |

FIG. 21

| PARAMETER | UNIT | VALUE (EXAMPLE) |
|---|---|---|
| A1 | [s] | −0.001 |
| A2 | [s] | +0.001 |
| B1 | [s] | −0.0002 |
| B2 | [s] | +0.0002 |
| x1 | [ppm] | −100 |
| x2 | [ppm] | +100 |
| y1 | [ppm] | −100 |
| y2 | [ppm] | +100 |
| T | [s] | 2 |

DISTRIBUTION DEVICE, DISTRIBUTION SYSTEM, AND DISTRIBUTION METHOD

CROSS-REFERENCE TO RELATED APPLICATION

This is a continuation application of International Application number PCT/JP2014/061328, which was filed on Apr. 22, 2014 and designated the United States. Furthermore, this application claims the benefit of foreign priority of Japanese application number 2013-123863, filed on Jun. 12, 2013. The disclosures of both of these earlier applications are incorporated herein by reference.

BACKGROUND OF THE INVENTION

Technical Field

The present invention relates to a distribution device, distribution system, and distribution method.

Background Art

Monitoring technology whereby sensor device including sensors typified by an acceleration sensor, a displacement sensor, and the like is attached to a structure such as a building or bridge, thus monitoring the state of the structure, is known (NPL 1). The sensor device utilized in the monitoring technology executes a process of detecting change in the state of the structure (acceleration, displacement, and the like) in a constant cycle. The result of the process is temporarily recorded together with time information in the sensor device, or the like. Then, the recorded result is transmitted via, for example, a network or the like to an external device.

The sensor device executes a process for detecting a change in state in a constant cycle. Depending on the object or target of monitoring, the cycle may be an extremely short cycle. For example, in order to analyze vibration arising from microtremors or earthquakes, an acceleration sensor needs to continuously measure acceleration in a constant cycle of in the region of 5 to 10 milliseconds.

Meanwhile, in order to detect and record vibration and the like arising in a structure, the sensor device synchronizes time using time information provided from the exterior. This sensor device is connected on a network to an external device that manages time, and synchronize time using protocol known as NTP (Network Time Protocol) or RBS (Reference Broadcast Synchronization) (NPL 2 and 3). When using protocol like NTP, technology that corrects time information taking a transmission delay time into consideration is utilized (NPL 4).

PTL 1 discloses technology whereby multiple items of device having a radio clock reception function are such that the times of all the items of device are synchronized by acquiring a reference time using a standard time and frequency signal.

PTL 2 discloses technology whereby an amount of time correction is determined using the difference in time between a GPS-derived time and a stable, high accuracy atomic clock-derived time, and time synchronization of mutually connected base stations or communication devices is carried out via the Synchronous Ethernet (registered trademark).

PTL 3 discloses a time synchronization system wherein time synchronization is carried out using NPT when time synchronization requests transmitted from a client to a server reach a certain number.

PTL 4 discloses technology whereby an NTP server that has received a time synchronization request from an NTP client transmits determination information to the NPT client, and the client determines whether or not to carry out time synchronization using the determination information.

CITATION LIST

Patent Literature

PTL 1: JP-A-2007-18211
PTL 2: JP-A-2010-278546
PTL 3: JP-A-2003-110562
PTL 4: JP-A-2012-202897

Non-Patent Literature

NPL 1: Satoru Sakaue et al, "Applied MEMS Micro-vibration Sensors and Structural Health Monitoring", Fuji Electric Journal, Vol. 84, No. 4, 2011, Pages 269 to 273
NPL 2: Makoto Suzuki et al, "Research Trends in Wireless Sensor Network Time Synchronization Technology", Morikawa Laboratory, Technical Research Report No. 2008001, Apr. 24, 2008
NPL 3: "The Institute of Electronics, Information and Communication Engineers (Knowledge Base)", Institute of Electronics, Information and Communication Engineers, 2010
NPL 4: Shoji Yoshida et al, "Development of Real-time Ethernet (registered trademark) Optical Transmission to Provide with Sampling Synchronization by IEEE1588", The Institute of Electrical Engineers of Japan, Aug. 31, 2010

SUMMARY OF THE INVENTION

For example, the kind of device used in monitoring corrects the time of its own local clock using time information provided from an external device. Then, using the local clock, the device records the results of a process executed in a constant cycle.

Herein, the existing technology is such that even when the time indicated by the time information provided from the external device and the local time of the device differ widely, the device carries out adjustment of the local time. As a result of this, it may happen that the results of the process carried out by the device are not recorded in a constant cycle, causing a problem when subsequently analyzing the results.

The invention, having been contrived bearing in mind this kind of problem, has an object of distributing time information so that the device can execute a process at a stable time interval.

In order to resolve the heretofore described problem, thus achieving the object, a distribution device in an embodiment of the invention is a distribution device that distributes time information to one or more items of equipment, and includes a storage unit that stores correction amount information indicating a correction amount by which a local time of the distribution device is to be corrected at one time, an acquisition unit that acquires a reference time, a calculation unit that calculates the difference between the acquired reference time and the local time, a correction unit that corrects the local time by the correction amount when the calculated difference is greater than the correction amount, and a distribution unit that distributes time information indicating the corrected local time to the equipment.

Also, a distribution system in an embodiment of the invention is a distribution system including one or more items of equipment and a distribution device that distributes time information to the sensor equipment, wherein the distribution device includes a storage unit that stores correction amount information indicating a correction amount by which a local time of the distribution device is to be corrected at one time, an acquisition unit that acquires a reference time, a calculation unit that calculates the difference between the acquired reference time and the local time, a first correction unit that corrects the local time by the correction amount when the calculated difference is greater than the correction amount, and a distribution unit that distributes time information indicating the corrected local time to the equipment, and the equipment includes a reception unit that receives the time information distributed by the distribution unit, and a management unit that corrects a local time of the equipment so as to coincide with the time indicated by the received time information.

Also, a distribution method in an embodiment of the invention is a distribution method whereby time information is distributed to one or more items of equipment, and includes an acquisition step of acquiring a reference time, a calculation step of calculating the difference between the acquired reference time and a local time of a distribution device, a correction step of, when the calculated difference is greater than a correction amount by which the local time is to be corrected at one time, correcting the local time by the correction amount, and a distribution step of distributing time information indicating the corrected local time to the equipment.

According to the invention, time information can be distributed so that the device can execute a process at a stable time interval.

BRIEF DESCRIPTION OF THE DRAWINGS

FIG. 19 is a diagram showing an example of parameters for determining a time distribution interval.

FIG. 21 is a diagram showing an example of parameters for determining a time distribution interval.

DETAILED DESCRIPTION OF THE INVENTION

Figure 1:
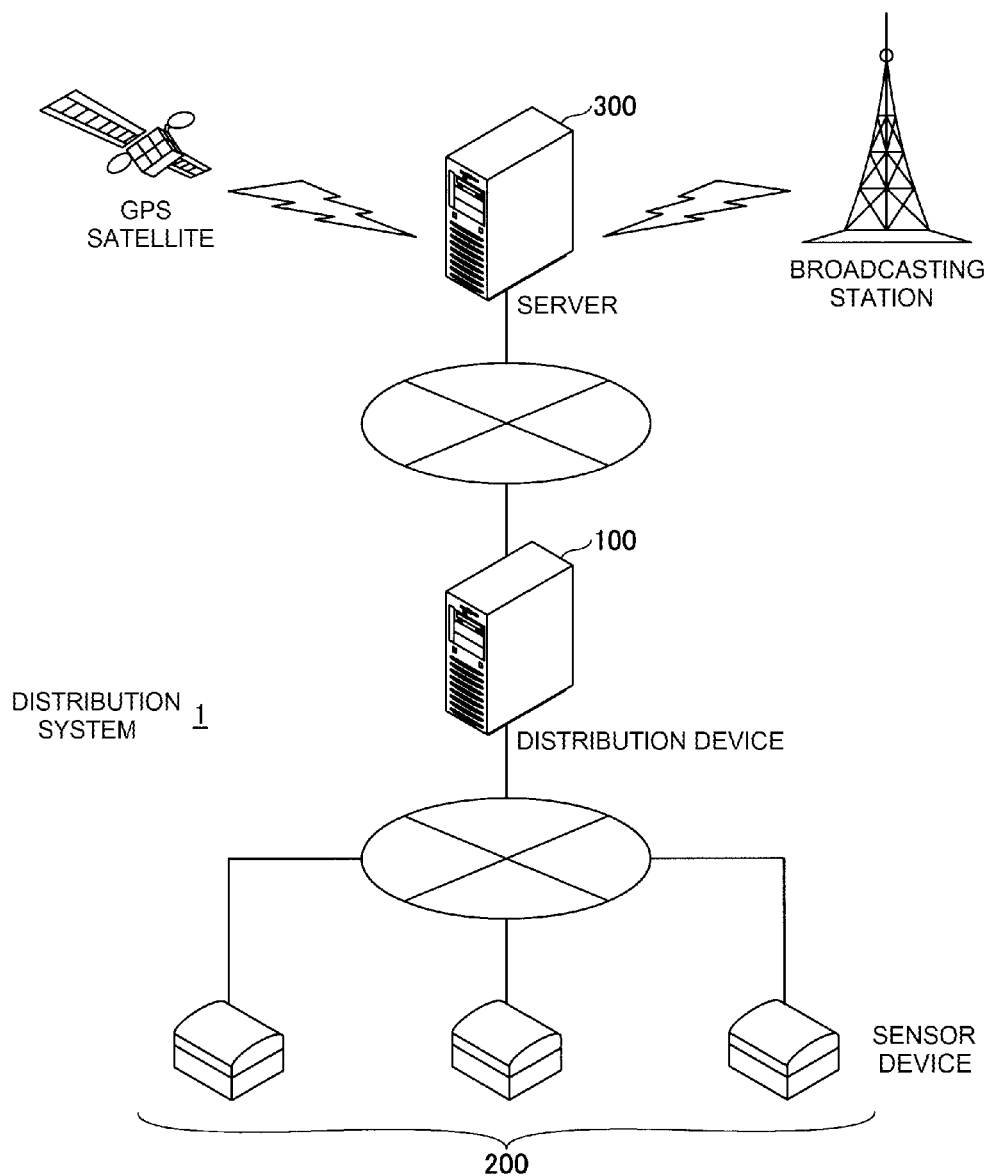
FIG. 1 is a diagram showing a configuration example of a distribution system according to an embodiment of the invention.

Hereafter, based on the drawings, a description will be given of an embodiment of the invention.
1. System outline
2. Hardware configuration
   2.1 Distribution device
   2.2 Sensor device
3. Functional configuration
   3.1 Distribution device
   3.2 Sensor device
4. Operation examples
   4.1 Local time adjustment process
   4.2 Time distribution process
   4.3 Distribution system operation sequence
5. Operational advantages
6. Modification examples
7. Parameter determination method 1. System Outline FIG. 1 is a diagram showing an outline of a distribution system 1 according to an embodiment of the invention. The distribution system 1 includes a distribution device 100, one or more of sensor device 200, and a server 300. The distribution device 100 is connected to the server 300 via a network such as the Internet or an intranet. Also, the distribution device 100 is connected to the sensor device 200 by a cable or wireless LAN (Local Area Network), PAN (Personal Area Network), dedicated signal line, or the like.

The server 300 is configured of, for example, a computer for server application. The server 300 provides the distribution device 100 with time information indicating the precise current time using, for example, NTP. For example, the server 300 can acquire the precise current time using radio waves received from a GPS (Global Positioning System) satellite. Also, the server 300 may acquire the precise current time using a standard time and frequency signal received from a transmission station. Also, the server 300 may acquire the precise current time using an atomic clock included inside a housing. Also, the server 300 may acquire the precise current time by synchronizing time with an external NTP server. The server 300 acquires the precise current time using the heretofore described means, and provides the distribution device 100 with time information indicating that time. Hereafter, the precise current time acquired by the heretofore described means will be called the "reference time".

The distribution device 100 corrects or adjusts the time of a local clock (hereafter referred to as local time) stored in the distribution device 100 using the reference time provided from the server 300. Then, the distribution device 100 distributes time information of the adjusted local time to the sensor device 200 at a constant interval.

Herein, the distribution device 100 holds in advance a maximum unit of adjustment (hereafter referred to as an adjustment amount (time adjustment amount) or a correction amount) by which the local time can be adjusted at one time with respect to the acquired reference time. Consequently, when the difference between a reference time newly received from the server 300 and the local time is greater than the adjustment amount, the distribution device 100 sets a time that is the current local time moved forward (or backward) within the range of the adjustment amount as a new local time.

For example, when the acquired reference time is 12:00:00.0020 in a case wherein the adjustment amount is 0.0002 seconds and the current local time is 12:00:00.0000, the local time is adjusted to "12:00:00.0001" or "12:00:00.0002". Also, when the acquired reference time is 11:59:59.9980 in a case wherein the adjustment amount is 0.0002 seconds and the local time is 12:00:00.0000, the local time is adjusted to "11:59:59.9998" or "11:59:59.9999".

The sensor device 200 has sensors such as an acceleration sensor, a displacement sensor, a strain sensor, or a temperature sensor, and executes status acquisition processes at a constant interval using the sensors. Also, the sensor device 200 adjusts the time of a local clock included in the sensor device 200 using time information distributed from the distribution device 100. That is, by executing each process in accordance with the time adjusted by the distribution device 100, the sensor device 200 can continuously execute the processes at a stable time interval. That is, by the local times of the distribution device 100 and sensor device 200 being widely adjusted, it is possible to avoid a problem of a period in which the process results are not recorded occurring. This is advantageous when carrying out an analysis process that needs measurement data at the constant interval. Also, when there are multiple sensor devices, there is an advantage in that data can be measured at the constant interval and synchronized to be simultaneous.

Figure 2:
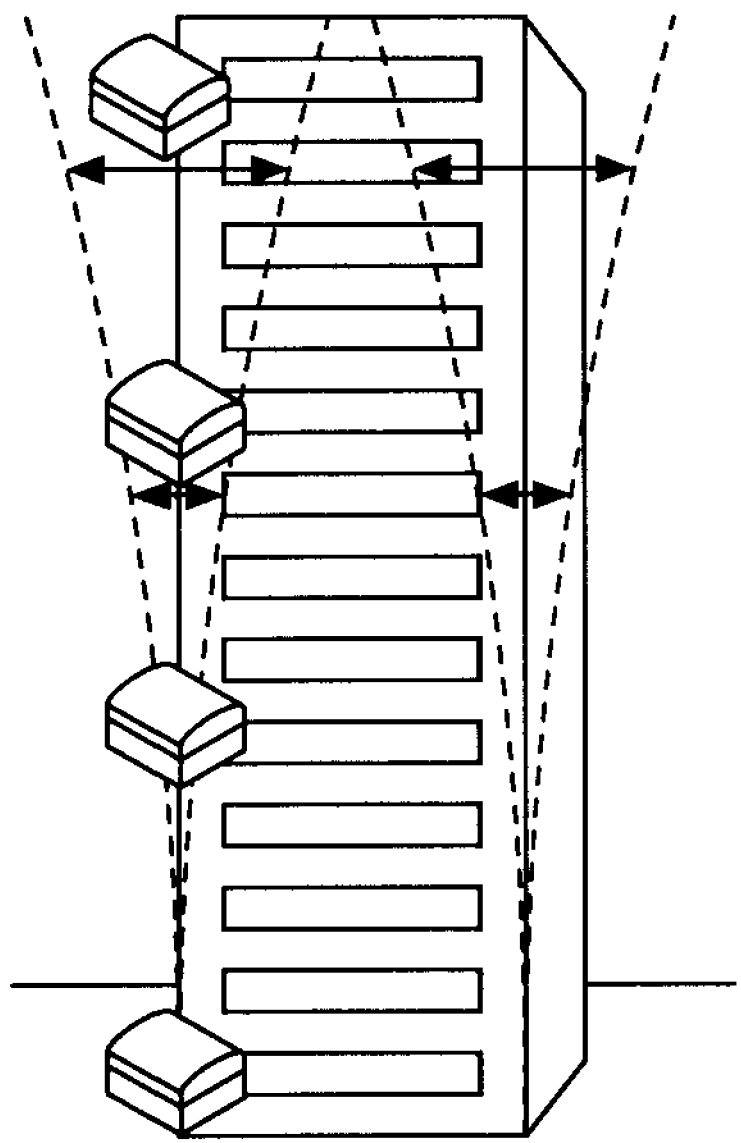
FIG. 2 is a diagram showing an installation example of sensor device according to an embodiment of the invention.
Figure 3:
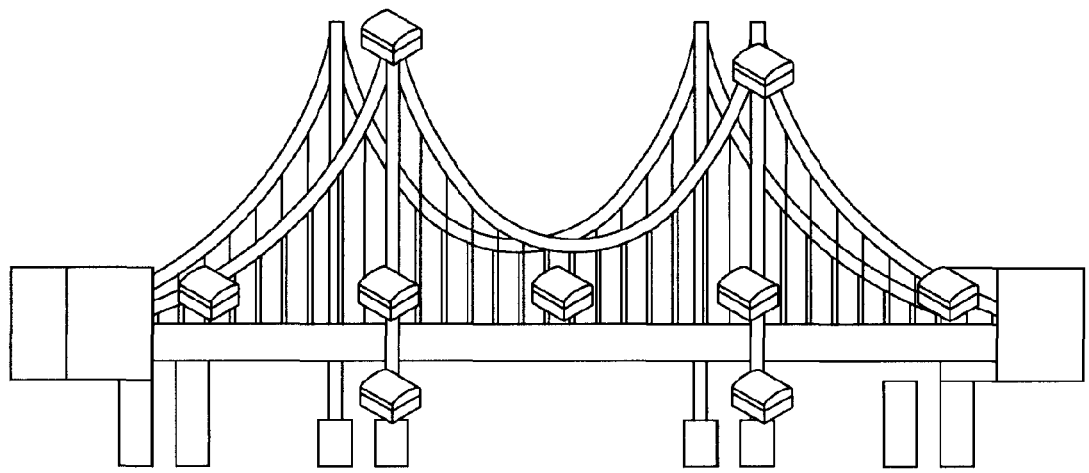
FIG. 3 is a diagram showing an installation example of sensor device according to an embodiment of the invention.
Figure 4:
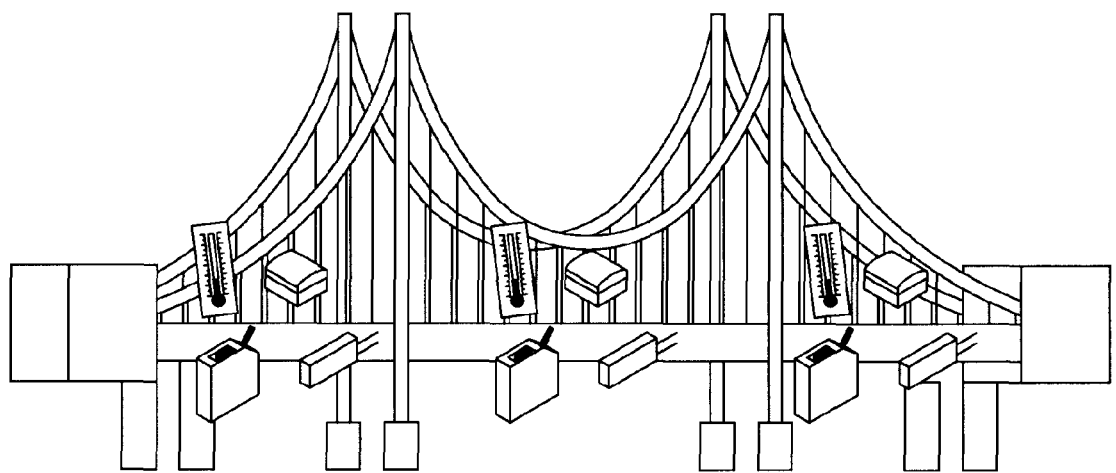
FIG. 4 is a diagram showing an installation example of sensor device according to an embodiment of the invention.

FIG. 2, FIG. 3, and FIG. 4 show examples wherein the sensor device 200 is installed on a building or bridge. In FIG. 2, sensor device having an acceleration sensor is provided on each floor of a building. Shaking of the building due to an earthquake can be observed on each floor using this kind of sensor device. Also, in FIG. 3, sensor device having an acceleration sensor is provided in various places on a bridge in order to observe shaking of the bridge. Furthermore, in FIG. 4, sensor device having a temperature sensor and sensor device having a displacement sensor are provided in various places on a bridge in order to observe the strength, strain, and the like, of the bridge. As heretofore described, these sensor devices 200 execute status measuring processes at the constant interval and simultaneously (that is, in synchronization), using time information distributed from the distribution device 100.

Also, it is particularly preferable that the distribution device 100 and sensor device 200 are of a configuration wherein they are distributed in the same segment of a cable LAN, and no other device is connected in the network. This kind of configuration provides stable time synchronization performance to an accuracy of 1 ms.

Hereafter, a detailed description will be given of components configuring the distribution system 1.

2. Hardware Configuration

Using FIG. 5 and FIG. 6, a description will be given of a hardware configuration example of the distribution device 100 and sensor device 200 according to the embodiment of the invention.

(2.1 Distribution Device)

Figure 5:
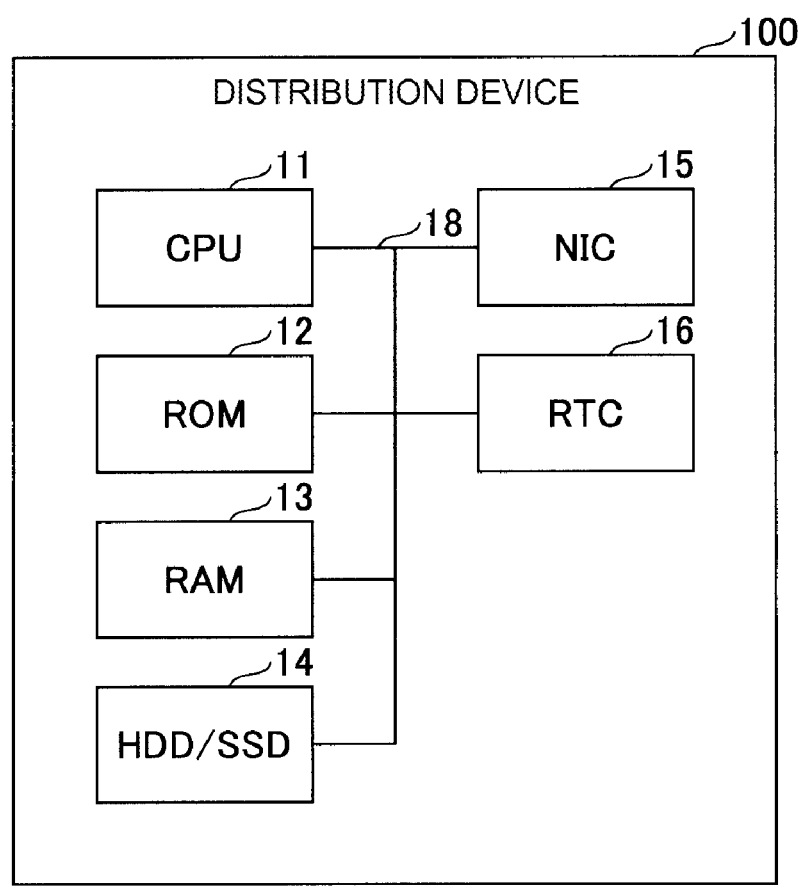
FIG. 5 is a hardware configuration diagram of a distribution device according to an embodiment of the invention.

FIG. 5 shows a hardware configuration example of the distribution device 100 according to the embodiment of the invention. The distribution device 100 has a CPU 11, a ROM 12, a RAM 13, an HDD (hard disk drive)/SSD (solid state drive) 14, an NIC (network interface card) 15, and an RTC (real time clock) 16.

The CPU 11 executes a program that carries out operation control of the distribution device 100. The ROM 12 stores a system program executed by the CPU 11. The RAM 13 configures the work area of the CPU 11. The HDD/SSD 14 stores programs, data, and the like of an OS, applications, and the like executed by the CPU 11. The NIC 15 includes a cable communication interface and a control device thereof, and is used for carrying out communication with the sensor device 200 and server 300. The RTC 16 is a device for managing the local time. A bus 18 connects the devices configuring the distribution device 100 to each other, and carries out data exchange.

According to the heretofore described configuration, the distribution device 100 according to the embodiment of the invention can adjust the local time with respect to an acquired reference time within a pre-specified adjustment amount range, and distribute the local time to sensor device.

The distribution device 100 may have a wireless LAN module for carrying out communication using a wireless LAN, or a communication module for carrying out communication using Bluetooth (registered trademark) or ZigBee (registered trademark), together with the NIC 15 or instead of the NIC 15. Also, although the details will be described hereafter, the distribution device 100 may have a GPS receiver, atomic clock, or radio clock. Also, the distribution device 100 may include an input device, like a keyboard or mouse, that receives input from a user. Furthermore, the distribution device 100 may include a display that presents information to the user.

(2.2 Sensor Device)

Figure 6:
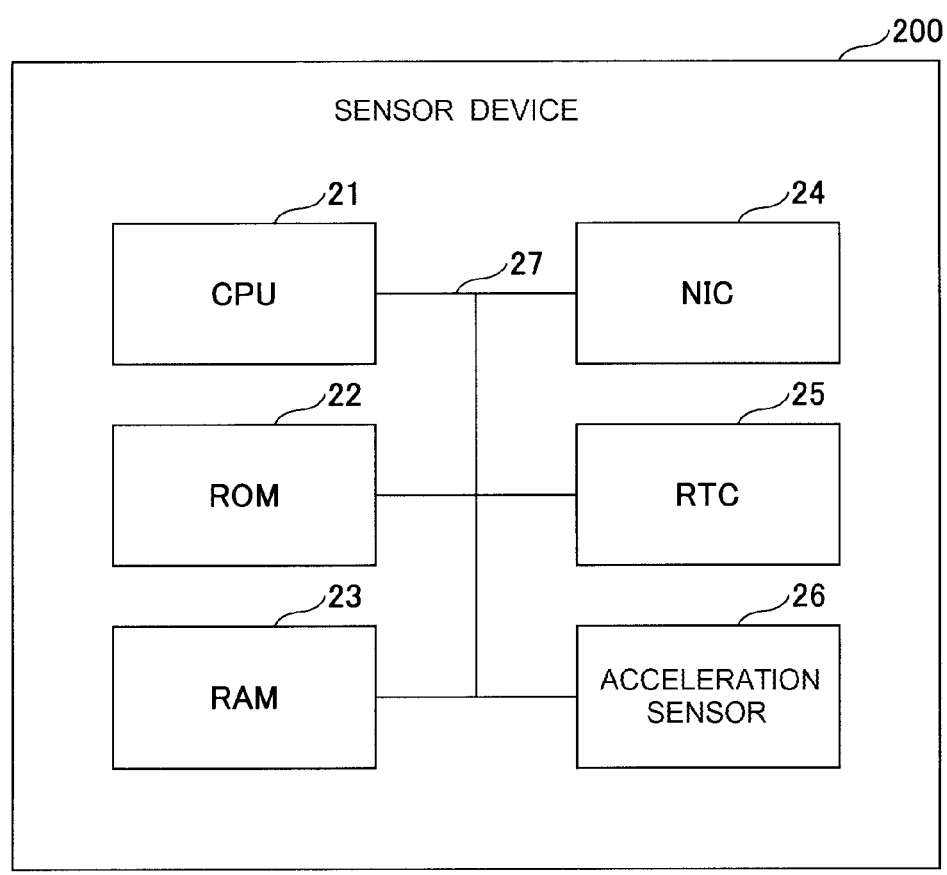
FIG. 6 is a hardware configuration diagram of the sensor device according to an embodiment of the invention.

FIG. 6 shows a hardware configuration example of the sensor device 200 according to the embodiment of the invention. The sensor device 200 of FIG. 6 is a configuration example of sensor device when having an acceleration sensor. The sensor device 200 has a CPU 21, a ROM 22, a RAM 23, an NIC 24, an RTC 25, and an acceleration sensor 26.

The CPU 21 executes a program that carries out operation control of the sensor device 200. The ROM 22 stores a program executed by the CPU 21. The RAM 23 configures the work area of the CPU 21. The NIC 24 includes a cable communication interface and a control device thereof, and is used for carrying out communication with the distribution device 100. The RTC 25 is a device for managing the local time. The acceleration sensor 26 is a device that detects acceleration applied to the sensor. A bus 27 connects the devices configuring the sensor device 200 to each other, and carries out data exchange.

According to the heretofore described configuration, the sensor device 200 according to the embodiment of the invention can adjust the local time using time information distributed from the distribution device 100, and execute a predetermined process at the constant interval.

The sensor device 200 may have a wireless LAN module for carrying out communication using a wireless LAN, or a communication module for carrying out communication using Bluetooth (registered trademark) or ZigBee (registered trademark), together with the NIC 24 or instead of the NIC 24.

3. Functional Configuration

Figure 7:
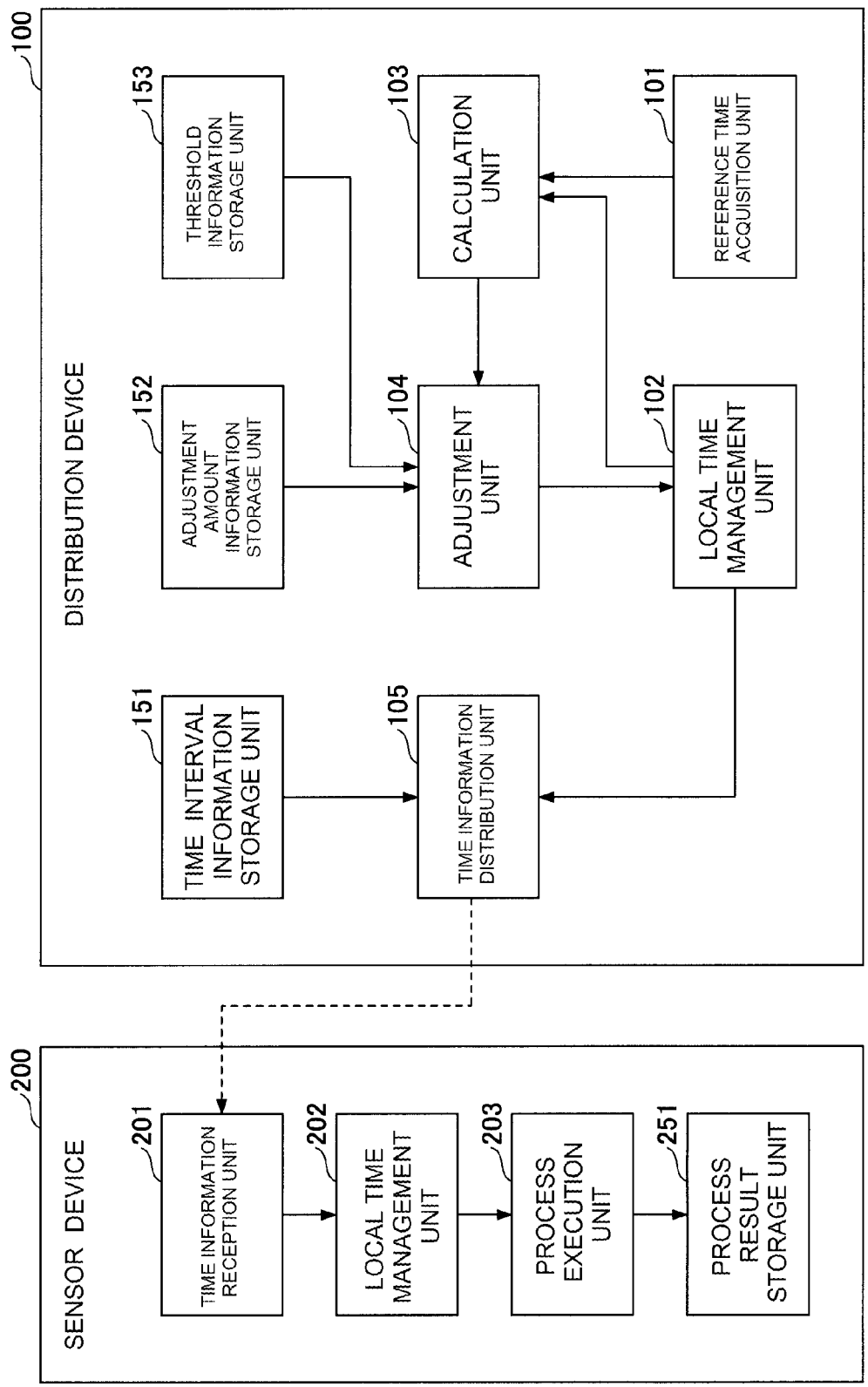
FIG. 7 is a functional block diagram of the distribution device and sensor device according to an embodiment of the invention.

Next, using FIG. 7, a description will be given of the functional configurations of the distribution device 100 and sensor device 200 according to the embodiment of the invention. Of the kinds of component included in the distribution device 100 and sensor device 200, the components particularly related to the description of the embodiment are shown in FIG. 7.

(3.1 Distribution Device)

The distribution device 100 has a reference time acquisition unit 101, a local time management unit 102, a calculation unit 103, an adjustment unit 104, a time information distribution unit 105, a time interval information storage unit 151, an adjustment amount information storage unit 152, and a threshold information storage unit 153. Of these, the time interval information storage unit 151, adjustment amount information storage unit 152, and threshold information storage unit 153 are realized by the HDD/SDD 14 of FIG. 5.

The time interval information storage unit 151 stores time interval information indicating a time interval T (unit: seconds) in which time information is to be distributed to the sensor device 200. The time interval T is determined in advance by the user in accordance with a parameter determination method, to be described hereafter.

The adjustment amount information storage unit 152 stores adjustment amount information indicating an adjustment amount B by which the local time of the distribution device 100 can be adjusted at one time. The adjustment amount B is determined in advance by the user in accordance with a parameter determination method, to be described hereafter. The adjustment amount B is determined in accordance with an acceptable error amount of a length of an execution interval during which the sensor device 200 performs a sensing operation.

The threshold information storage unit 153 stores threshold information indicating a threshold S of the difference between an acquired reference time and the local time of the distribution device 100. When the difference between the acquired reference time and the local time is greater than the threshold S, the local time may be adjusted in accordance with the acquired reference time. This is because when the difference between the reference time and the local time is markedly large, the time recorded together with the process results of the sensor device 200 may diverge from the actual time, causing an impediment to subsequent analysis. Consequently, the threshold S is set to a value sufficiently larger than the adjustment amount B.

The reference time acquisition unit 101 is mainly realized by processes of the CPU 11 and NIC 15, and acquires time information indicating a reference time from the external server 300. The reference time acquisition unit 101, for example, can acquire time information from the server 300 using a function of an NTP client. The reference time acquisition unit 101 can acquire time information from the server 300 using an arbitrary protocol.

Although the details will be described hereafter, the reference time acquisition unit 101 may acquire a reference time by itself via the NIC 15, without acquiring a reference time from the server 300. For example, the distribution device 100 may include a GPS receiver or radio clock, and the reference time acquisition unit 101 acquire a reference time via these devices.

Also, the reference time acquisition unit 101 can acquire a reference time at an arbitrary timing.

The local time management unit 102 is mainly realized by processes of the CPU 11 and RTC 16, and manages the local time in the distribution device 100. The local time may be held inside the distribution device, or may be acquired from an external device.

The calculation unit 103 is mainly realized by a process of the CPU 11, and calculates a difference D between a reference time acquired by the reference time acquisition unit 101 and the local time acquired from the local time management unit 102.

The adjustment unit 104 is mainly realized by a process of the CPU 11, and determines to what extent the local time managed by the local time management unit 102 is to be adjusted in accordance with the size of the difference D calculated by the calculation unit 103. At this time, the adjustment unit 104 carries out the determination referring to the adjustment amount information stored in the adjustment amount information storage unit 152 and the threshold information stored in the threshold information storage unit 153. Then, the adjustment unit 104 adjusts the local time in accordance with the following conditions.

(1) Difference D≤adjustment amount B: the local time is adjusted to the reference time (2) Adjustment amount B<difference D≤threshold S: the local time is brought closer to the reference time within the adjustment amount range (3) Threshold S<difference D: the local time is adjusted to the reference time (4) Immediately after the distribution device is started up: the local time is adjusted to the reference time There is a possibility that the local time managed by the local time management unit 102 is deviating considerably from the actual time immediately after the distribution device 100 is started up, because of which the local time is adjusted to the reference time, as shown in (4).

The time information distribution unit 105 is mainly realized by processes of the CPU 11 and NIC 15. The time information distribution unit 105 refers to the time interval information stored by the time interval information storage unit 151, and distributes time information including the local time managed by the local time management unit 102 to the sensor device 200 at the constant time interval T. The time information distribution unit 105 distributes time information to the sensor device 200 using, for example, NTP. When using NTP, the time information distribution unit 105 distributes time information in accordance with a time distribution request transmitted from the sensor device 200. Herein, the distributed time information may be adjusted as appropriate in accordance with a network propagation delay time. For example, the method described in NPL 4 can be used as a method of adjusting the time information. The time information distribution unit 105 can distribute time information to the sensor device 200 using arbitrary protocol.

The time information distribution unit 105 holds the most recent time of distributing time information, and adopts a time wherein the time interval T is added to the most recent time as the distribution time of the next time information.

According to the heretofore described functions, the distribution device 100 according to the embodiment of the invention can distribute time information indicating a time adjusted within a pre-specified adjustment amount range to the sensor device 200. As a result of this, the sensor device 200 can continuously execute a measuring process within the acceptable amount of error in the execution interval.

(3.2 Sensor Device)

The sensor device 200 has a time information reception unit 201, a local time management unit 202, a process execution unit 203, and a process result storage unit 251.

The time information reception unit 201 is mainly realized by processes of the CPU 21 and NIC 24, and receives time information transmitted from the time information distribution unit 105 of the distribution device 100. The time information reception unit 201 receives time information from the distribution device 100 using, for example, NTP. The time information reception unit 201 can receive time information from the distribution device 100 using arbitrary protocol.

The local time management unit 202 is mainly realized by processes of the CPU 21 and RTC 25, and manages the local time of the sensor device 200. The local time management unit 202 adjusts the local time to the time indicated by the time information received by the time information reception unit 201.

The process execution unit 203 is mainly realized by processes of the CPU 21 and acceleration sensor 26, and measures acceleration applied to the acceleration sensor 26 at the constant interval. For example, when measuring vibration applied to a structure arising from an earthquake, the process execution unit 203 executes an acceleration measurement process at a time interval of about 5 to 10 milliseconds. The execution interval may differ depending on the object of measurement (such as detecting shaking caused by an earthquake, or detecting abnormality in the strength of a building or the like), the structure (a building, a bridge, or the like) that forms the measurement target, and the measurement data (vibration, strain, displacement, temperature, or the like).

The process execution unit 203 may execute a measurement process using an arbitrary sensor, in addition to the measurement process using the acceleration sensor process, at the constant interval. Also, the process execution unit 203 may execute at the constant interval a general information process that does not use a sensor.

The process result storage unit 251 is realized by the ROM 22 of FIG. 6, and stores the result of a process by the process execution unit 203 together with the local time at which the process is executed.

According to the heretofore described functions, the sensor device 200 according to the embodiment of the invention can execute a measurement process within a range not exceeding the error tolerance of the execution interval.

Figure 23:
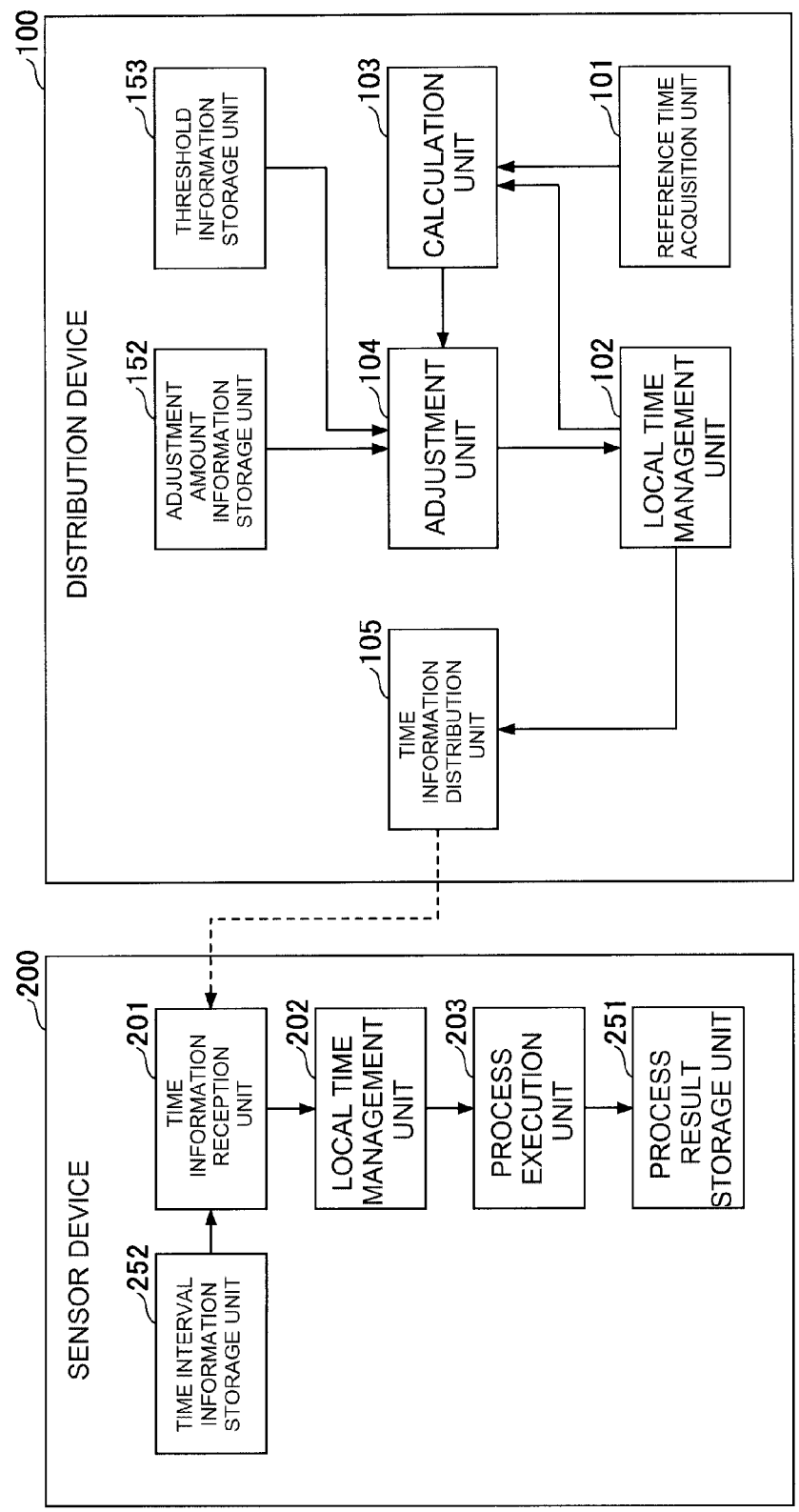
FIG. 23 is a block diagram of the distribution device and sensor device according to the embodiment of the invention.

The time information reception unit 201, when receiving time information using NTP, transmits a time distribution request to the distribution device 100 in accordance with a predetermined time interval, and receives time information as a response to the request. The predetermined time interval is the same as the time interval indicated by the time interval information stored in the time interval information storage unit 151 of the distribution device 100 of FIG. 7. Consequently, as shown in FIG. 23, the sensor device 200 may have a time interval information storage unit 252 having the same functions as the time interval information storage unit 151 of FIG. 7. That is, the time information reception unit 201 can receive time information from the distribution device 100 in accordance with the time interval information stored in the time interval information storage unit 252. Various items of information transmitted from the sensor device can also be received.

Also, when NTP is used, the distributed time information may be adjusted as appropriate in accordance with a network propagation delay time. For example, the method described in NPL 4 can be used as a method of adjusting the time information.

4. Operation Examples

Next, using FIG. 8 to FIG. 10, a description will be given of process flows of the distribution device 100 according to the embodiment of the invention and an operation example of the distribution system 1. Hereafter, processes of the distribution device 100 will be described divided into a local time adjustment process and a time distribution process.

(4.1 Local Time Adjustment Process)

Figure 8:
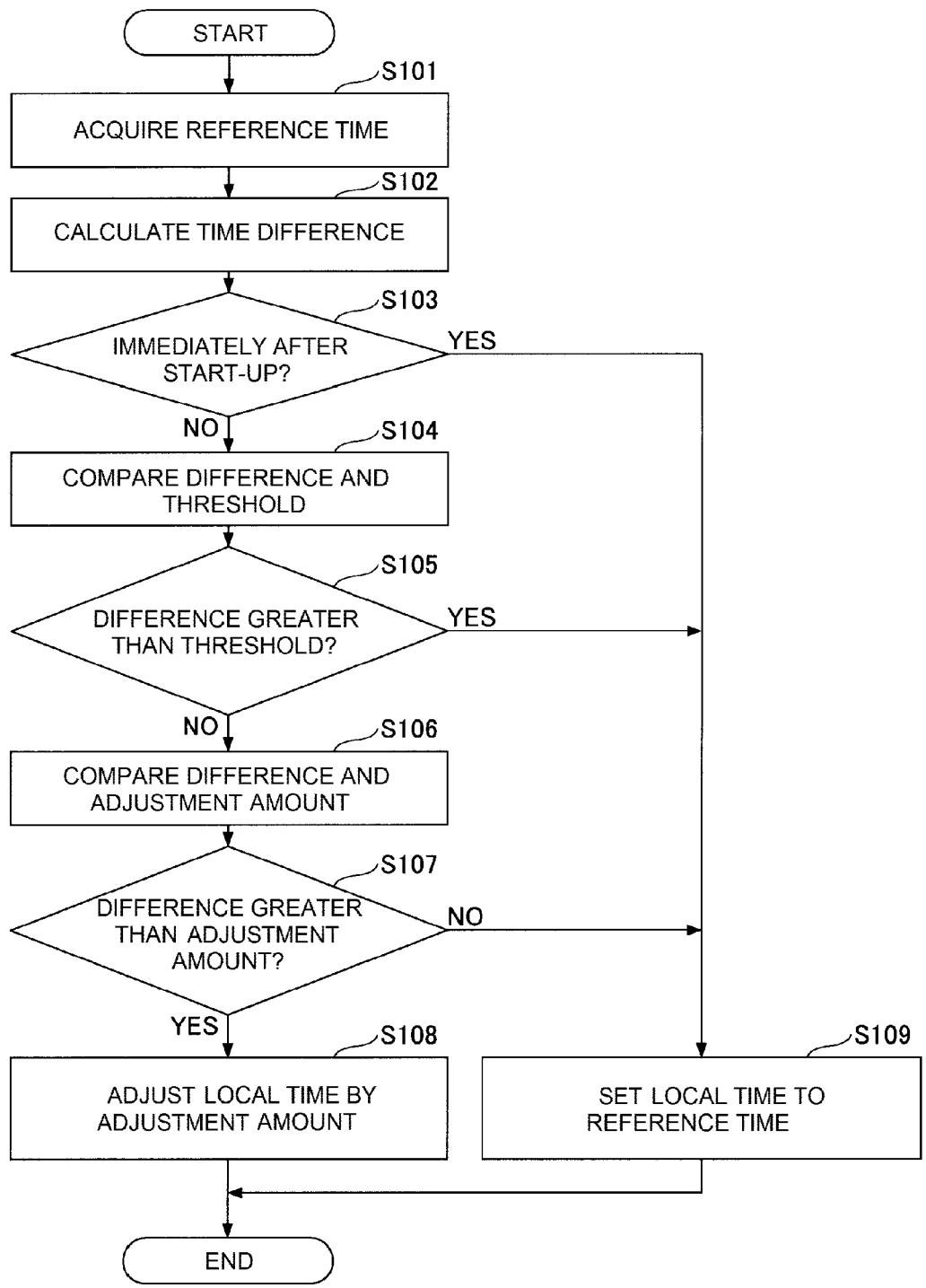
FIG. 8 is a flowchart showing a local time adjustment process of the distribution device according to an embodiment of the invention.

FIG. 8 is a flowchart showing the local time adjustment process of the distribution device 100 according to the embodiment of the invention.

Firstly, the reference time acquisition unit 101 acquires a reference time (step S101).

Next, the calculation unit 103 calculates the difference D between the reference time acquired in step S101 and the local time managed by the local time management unit 102 (step S102).

Next, the adjustment unit 104 determines to what extent the local time managed by the local time management unit 102 is to be adjusted in accordance with the size of the difference D calculated in step S102. Herein, when the determination is carried out immediately after the distribution device 100 starts up (that is, when the process flow is executed for the first time after starting up), the process proceeds to step S109 (Yes in step S103). When this is not the case, the process proceeds to step S104 (No in step S103).

Next, the adjustment unit 104 compares the difference D calculated in step S102 and the threshold S stored in the threshold information storage unit 153 (step S104). Then, when the difference D is greater than the threshold S, the process proceeds to step S109 (Yes in step S105). When this is not the case, the process proceeds to step S106 (No in step S105).

Next, the adjustment unit 104 compares the difference D calculated in step S102 and the adjustment amount B stored in the adjustment amount information storage unit 152 (step S106). Then, when the difference D is greater than the adjustment amount B, the process proceeds to step S108 (Yes in step S107). When this is not the case, the process proceeds to step S109 (No in step S107).

Then, in step S108, the adjustment unit 104 adjusts the local time within the adjustment amount range so that the local time approaches the reference time.

Also, in step S109, the adjustment unit 104 causes the local time to coincide with the reference time.

(4.2 Time Distribution Process)

Figure 9:
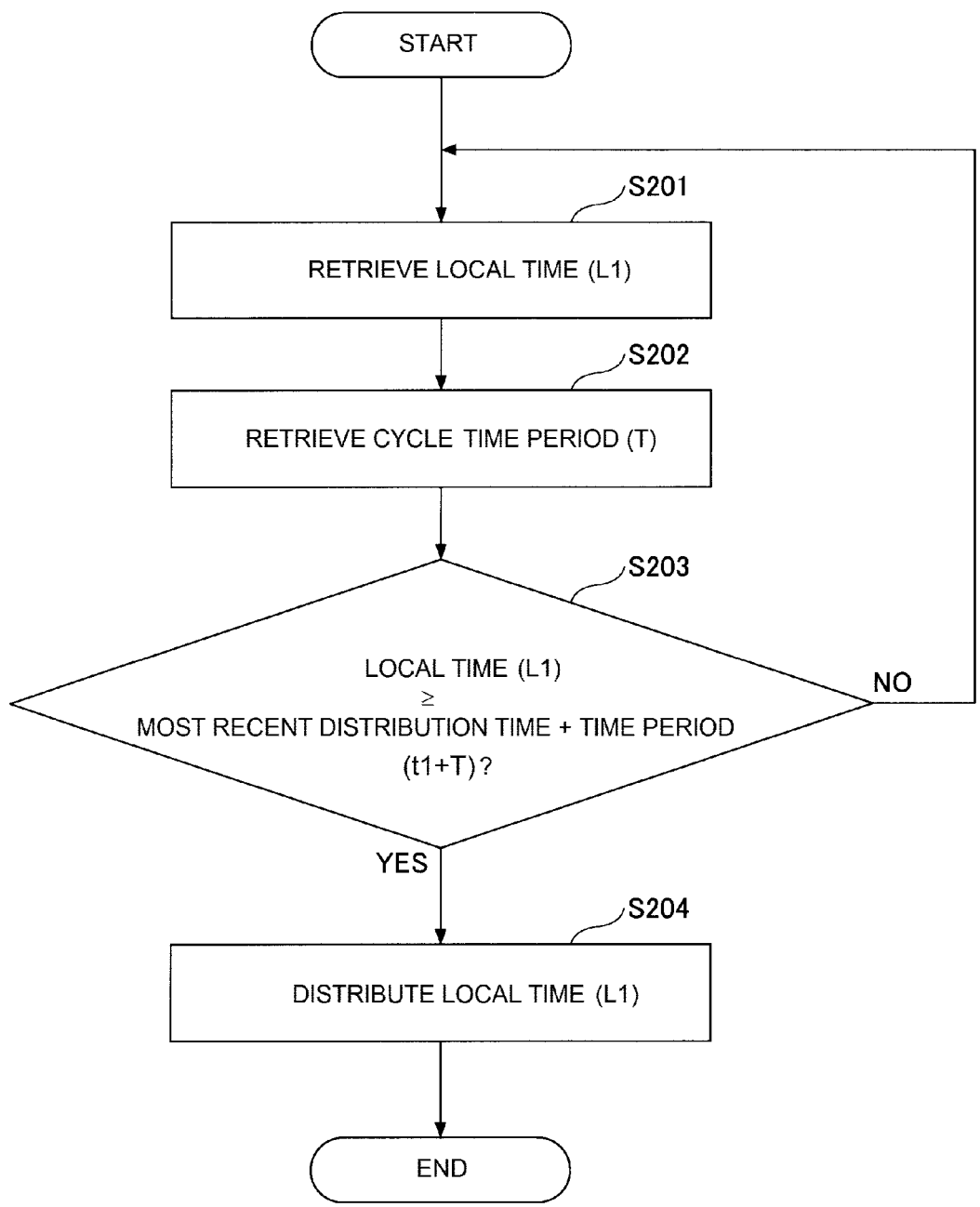
FIG. 9 is a flowchart showing a time distribution process of the distribution device according to an embodiment of the invention.

FIG. 9 is a flowchart showing the time distribution process of the distribution device 100 according to the embodiment of the invention.

Firstly, the time information distribution unit 105 retrieves the local time (L1) managed by the local time management unit 102 (step S201).

Next, the time information distribution unit 105 retrieves the time interval information stored in the time interval information (C) storage unit 151 (step S202).

Next, the time information distribution unit 105 determines whether a time that is the most recent time (t1) of distributing time information added to the time interval T retrieved in step S202 (=t1+T) is equivalent to the local time (L1) retrieved in step S201 (or whether the local time has elapsed) (L1≥(t1+T)). When the result is that the time is equivalent (or that the local time has elapsed) (Yes in step S203), the process proceeds to step S204, and the time information distribution unit 105 distributes time information indicating the local time (L1) to the sensor device 200. Meanwhile, when the time is not equivalent (or when the local time has not elapsed) (L1<(t1+T)) (No in step S203), the process returns to step S201.

(4.3 Distribution System Operation Sequence)

Figure 10:
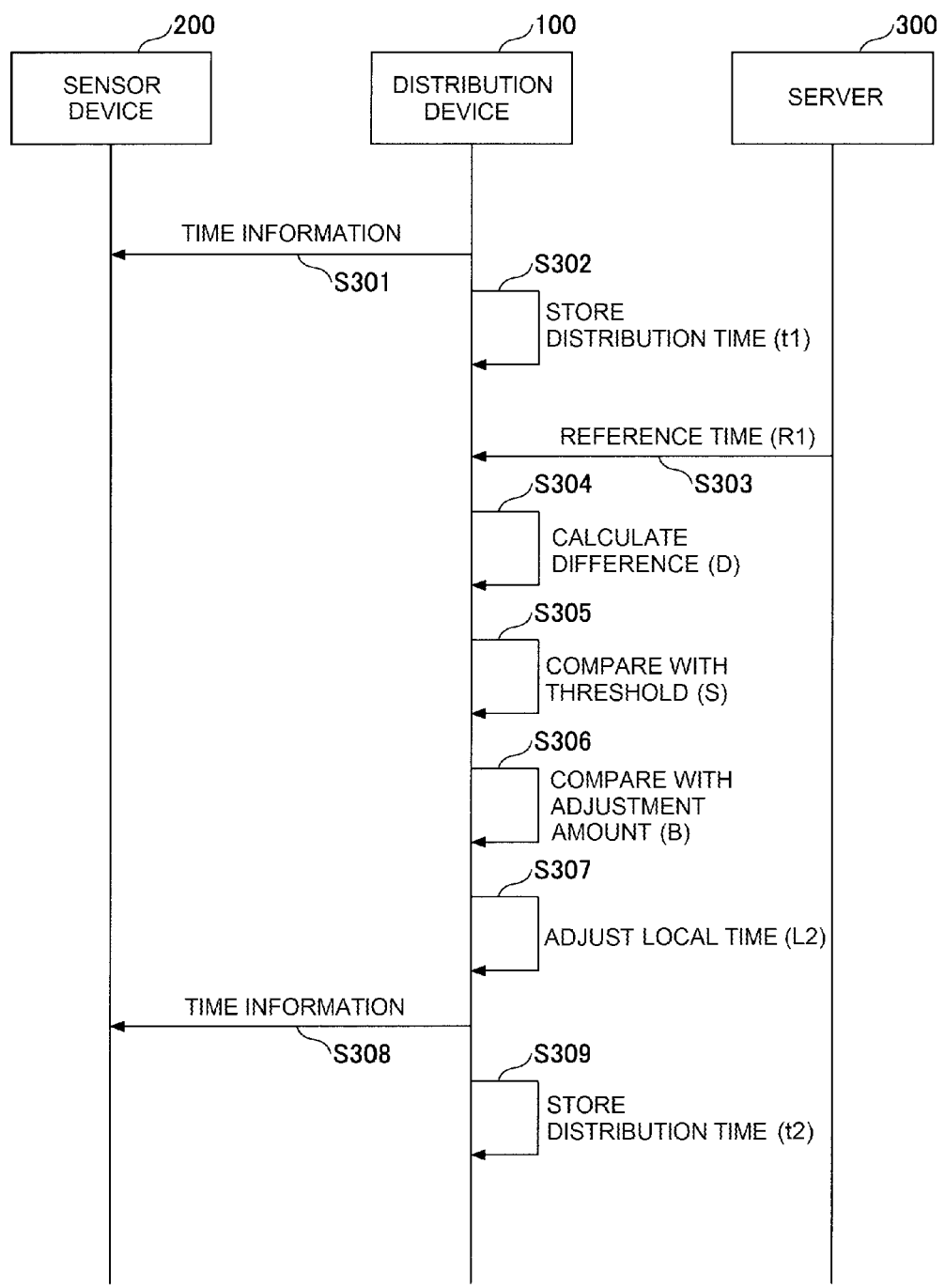
FIG. 10 is a sequence diagram showing an operation example of the distribution system according to an embodiment of the invention.

FIG. 10 is a sequence diagram showing an operation example of the distribution system 1 according to the embodiment of the invention. Herein, only one sensor device 200 is shown as a representative.

Firstly, the time information distribution unit 105 of the distribution device 100 acquires the local time (L1) managed by the local time management unit 102, and transmits the local time (L1) as time information to the time information reception unit 201 of the sensor device 200 (step S301).

Next, the time information distribution unit 105 of the distribution device 100 internally stores the time (t1) of distributing the time information in step S301 (step S302).

Next, the reference time acquisition unit 101 of the distribution device 100 acquires a reference time (R1) from the server 300 (step S303).

Next, the calculation unit 103 of the distribution device 100 calculates the difference D between the reference time (R1) acquired in step S303 and the local time (L1) managed by the local time management unit 102 (step S304).

Next, the adjustment unit 104 of the distribution device 100 compares the difference D calculated in step S304 and the threshold S stored in the threshold information storage unit 153 (step S305). Herein, the process proceeds to the next step provided that the difference D is equal to or smaller than the threshold S.

Next, the adjustment unit 104 of the distribution device 100 compares the difference D calculated in step S304 and the adjustment amount B stored in the adjustment amount information storage unit 152 (step S306). Herein, the process proceeds to the next step provided that the difference D is greater than the adjustment amount B.

Next, the adjustment unit 104 of the distribution device 100 adjusts the local time (L1) within a rage of the adjustment amount B so that the local time (L1) approaches the reference time (R1) acquired in step S303 (step S307).

Next, the time information distribution unit 105 of the distribution device 100 detects that an adjusted local time (L2) in step S307 has reached a time that is the time interval T added to the time (t1) stored in step S302 ((L2−L2)>(T+t1)), and transmits the local time (L2) as time information to the sensor device 200 (step S308).

Next, the time information distribution unit 105 of the distribution device 100 internally stores the time (t2) of distributing the time information in step S308 (step S309).

Thereafter, by repeating the same process operation, the distribution device 100 according to the embodiment of the invention can gradually adjust the local time with respect to the reference time, and distribute the local time to the sensor device. As a result of this, the sensor device that receives the local time can execute a predetermined process at a stable time interval.

After step S309, the adjustment unit 104 of the distribution device 100 may further adjust the local time (L2) without acquiring a new reference time. A difference D2 between the local time (L2) of the distribution device 100 after adjustment and the reference time is equivalent to the amount by which the local time is adjusted in step S307 subtracted from the difference D calculated in step S304. Consequently, the adjustment unit 104 can compare the difference D2 and adjustment amount B after step S309, and determine a further local time adjustment amount. By this kind of process being repeated, the local time of the distribution device 100 eventually coincides with the reference time.

5. Operational Advantages

Next, using FIG. 11 to FIG. 15 and FIG. 22, a description will be given of advantages obtained with the distribution device 100 according to the embodiment of the invention.

Figure 11:
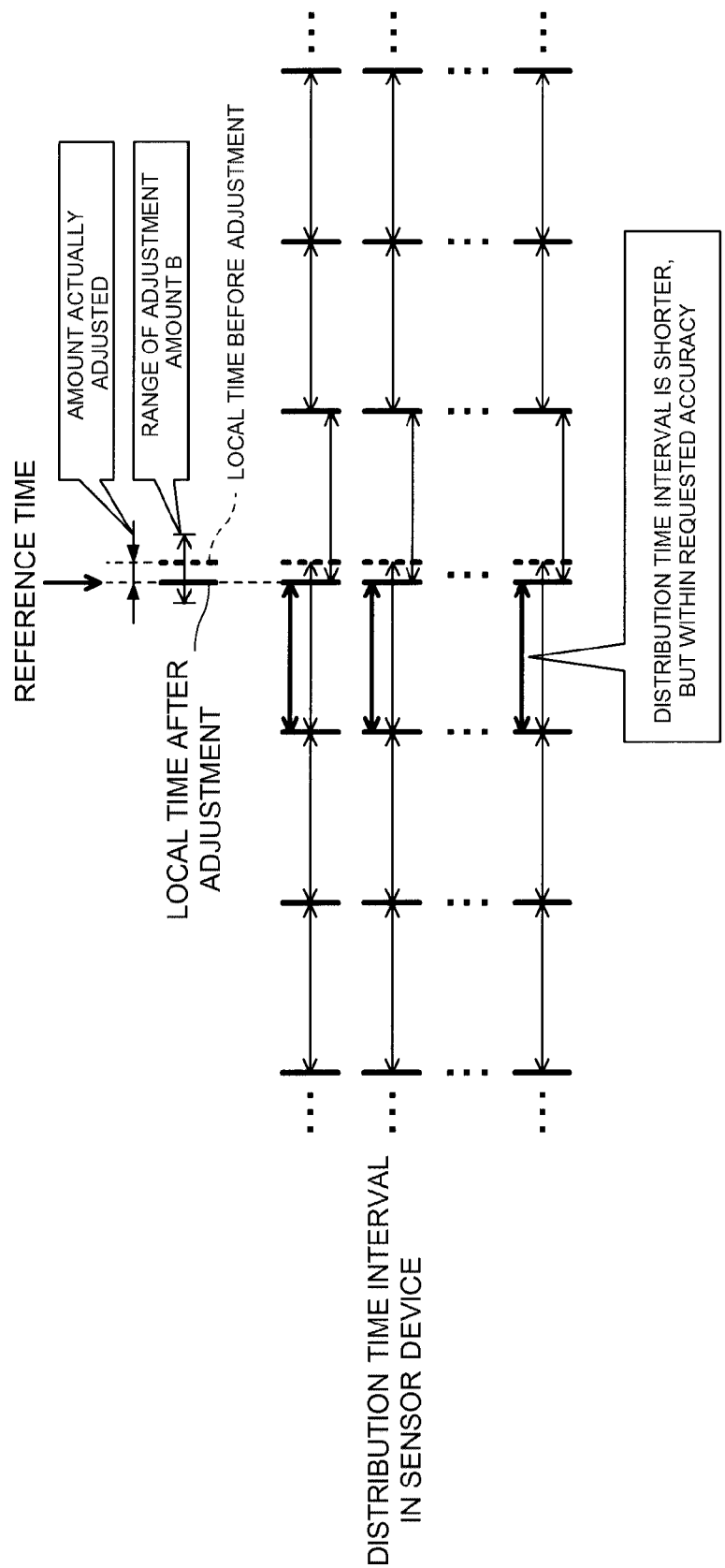
FIG. 11 is a timing chart showing before and after an adjustment of a local time according to an embodiment of the invention.

FIG. 11 represents an aspect of the distribution device 100 according to the embodiment of the invention distributing time information to three sensor devices. Herein, the example shown is of a case wherein the difference D between the reference time and the local time of the distribution device 100 is within the range of the adjustment amount B (the case of the heretofore described (1) wherein difference D adjustment amount B). In the example, the reference time is a certain time ahead (the difference D) of the local time of the distribution device 100, but the difference is equal to or smaller than the adjustment amount B. Consequently, the local time is adjusted so as to coincide with the reference time. Subsequently, the distribution device 100 distributes time information in accordance with the local time after adjustment. Consequently, the time interval during which each of sensor device processes the time information after reception is temporarily shortened by the difference D. However, this kind of time interval change satisfies the execution interval accuracy required of the sensor device. Herein, an example wherein the reference time is ahead of the local time of the distribution device 100 is shown, but the same also applies in a case wherein the reference time is behind the local time of the distribution device 100.

Figure 12:
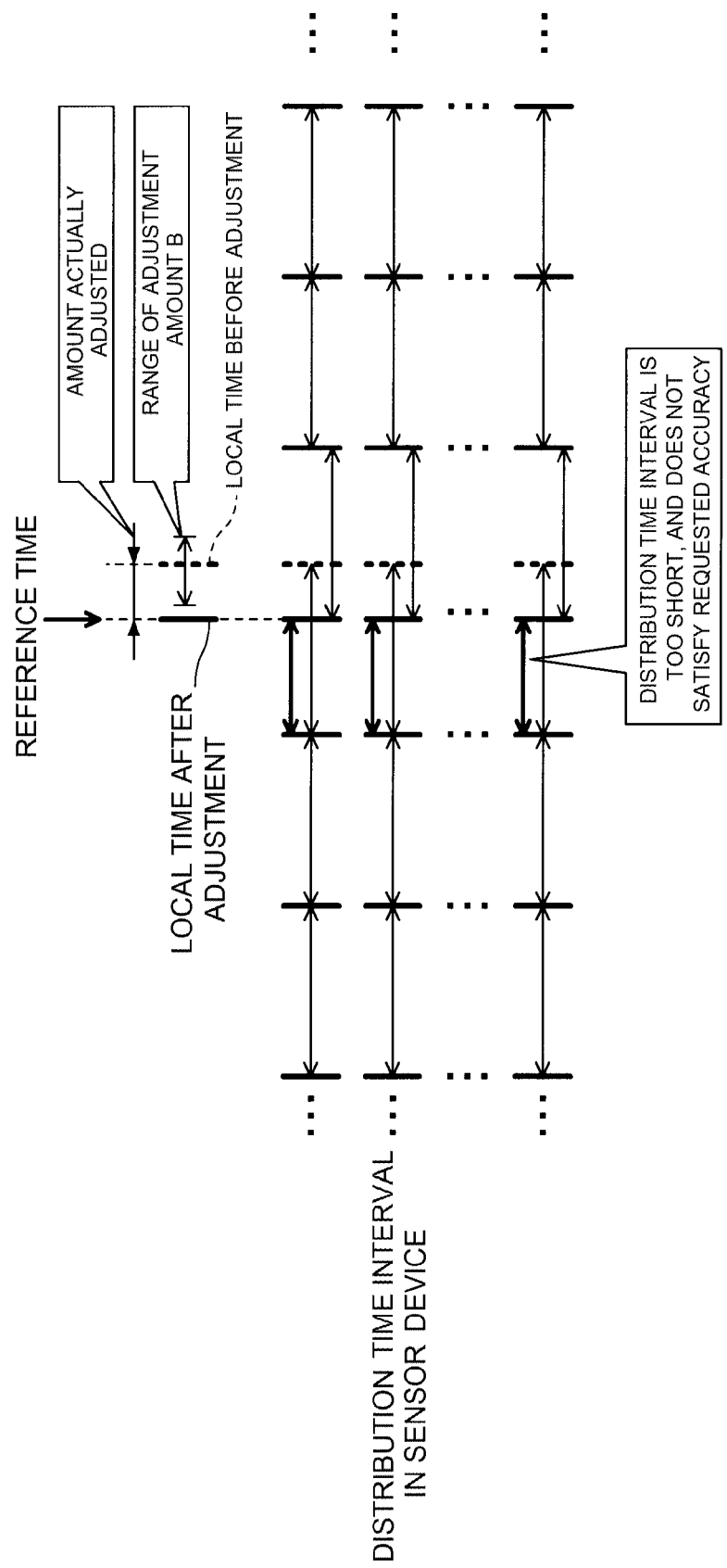
FIG. 12 is a timing chart showing before and after an adjustment of a local time according to a related art.

FIG. 12 schematically represents time information distribution by an existing distribution device not according to the invention. Herein, the example shown is of a case wherein the difference D between the reference time and the local time of the distribution device is not within the range of the adjustment amount B ((2) adjustment amount B<difference D≤threshold S). The distribution device not according to the invention adjusts the local time to the reference time regardless of the size of the difference between the reference time and local time. Consequently, as a result of the distribution device 100 distributing time information in accordance with the local time after adjustment, the time interval during which each of sensor devices executes a process fails to satisfy requirements. Herein, an example wherein the reference time is ahead of the local time of the distribution device 100 is shown, but the same also applies in a case wherein the reference time is behind the local time of the distribution device.

Figure 13:
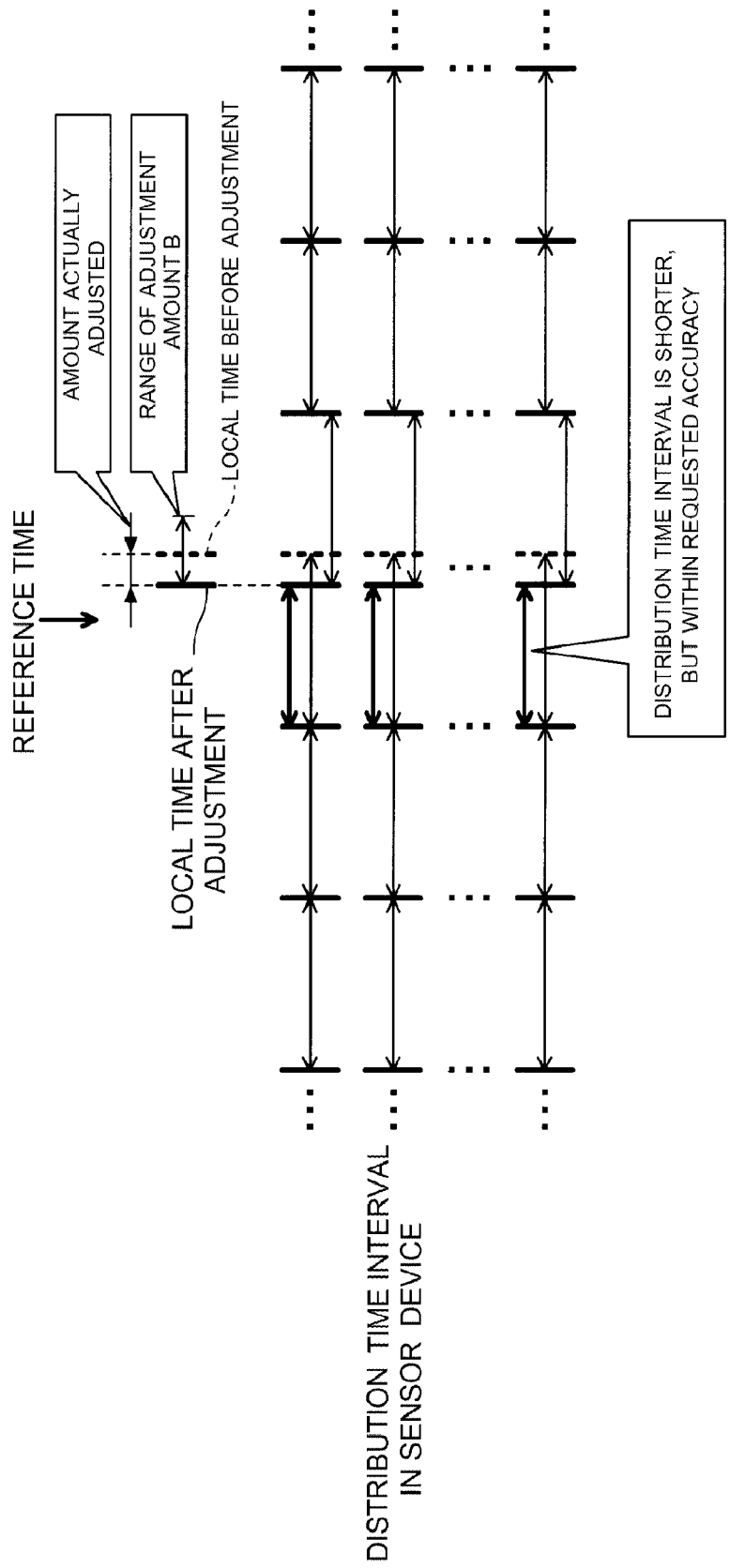
FIG. 13 is timing chart showing before and after an adjustment of a local time according to an embodiment of the invention.

Meanwhile, FIG. 13 schematically represents time information distribution by the distribution device 100 according to the embodiment of the invention. Herein, in the same way as in FIG. 12, the example shown is of a case wherein the difference D between the reference time and the local time of the distribution device is not within the range of the adjustment amount B ((2) adjustment amount B<difference D≤threshold S). The distribution device 100 according to the embodiment of the invention adjusts the local time to the reference time with the adjustment amount B as a limit. Consequently, time information can be distributed to the sensor device while maintaining a constant time interval, even when there is, for example, insufficient accuracy in the reference time itself or a communication delay between the server 300 providing the reference time and the distribution device 100. As a result of this, the sensor device can execute a measurement process at a stable time interval.

Figure 14:
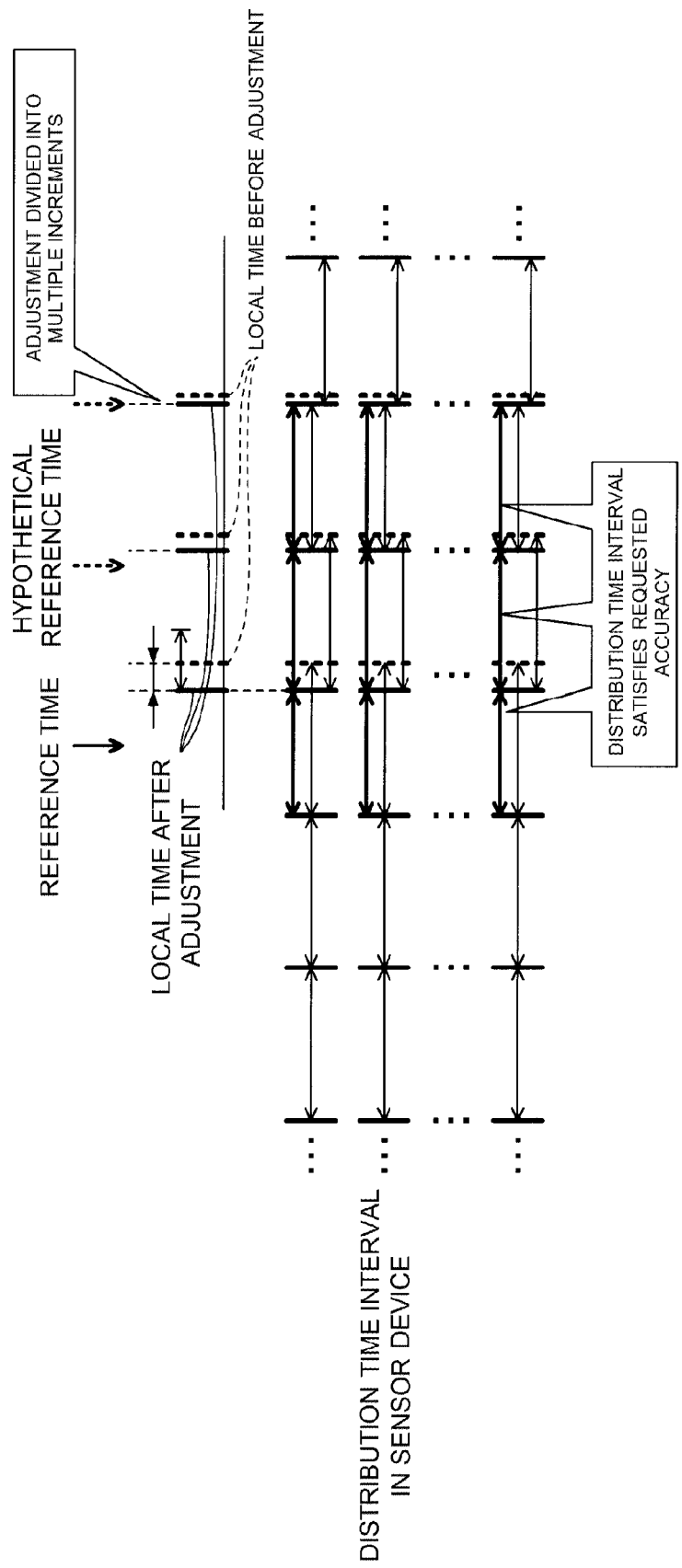
FIG. 14 is a timing chart showing before and after an adjustment of a local time according to an embodiment of the invention.

FIG. 14 represents an example wherein the reference time and local time are synchronized by the distribution device 100 according to the embodiment of the invention further adjusting the local time after the adjustment process shown in FIG. 13. In FIG. 14, the distribution device 100 adjusts the local time by the adjustment amount B so that the local time approaches the acquired reference time. Subsequently, the distribution device 100 again adjusts the local time within the range of the adjustment amount B before acquiring a new reference time. The distribution device 100 repeats the same process until the local time coincides with the reference time. By so doing, the distribution device 100 can gradually adjust the local time to the reference time within the range of the adjustment amount B. As a result of this, the change in the time information distribution time interval is within a certain range, and the sensor device can execute a measurement process at a stable time interval.

Figure 15:
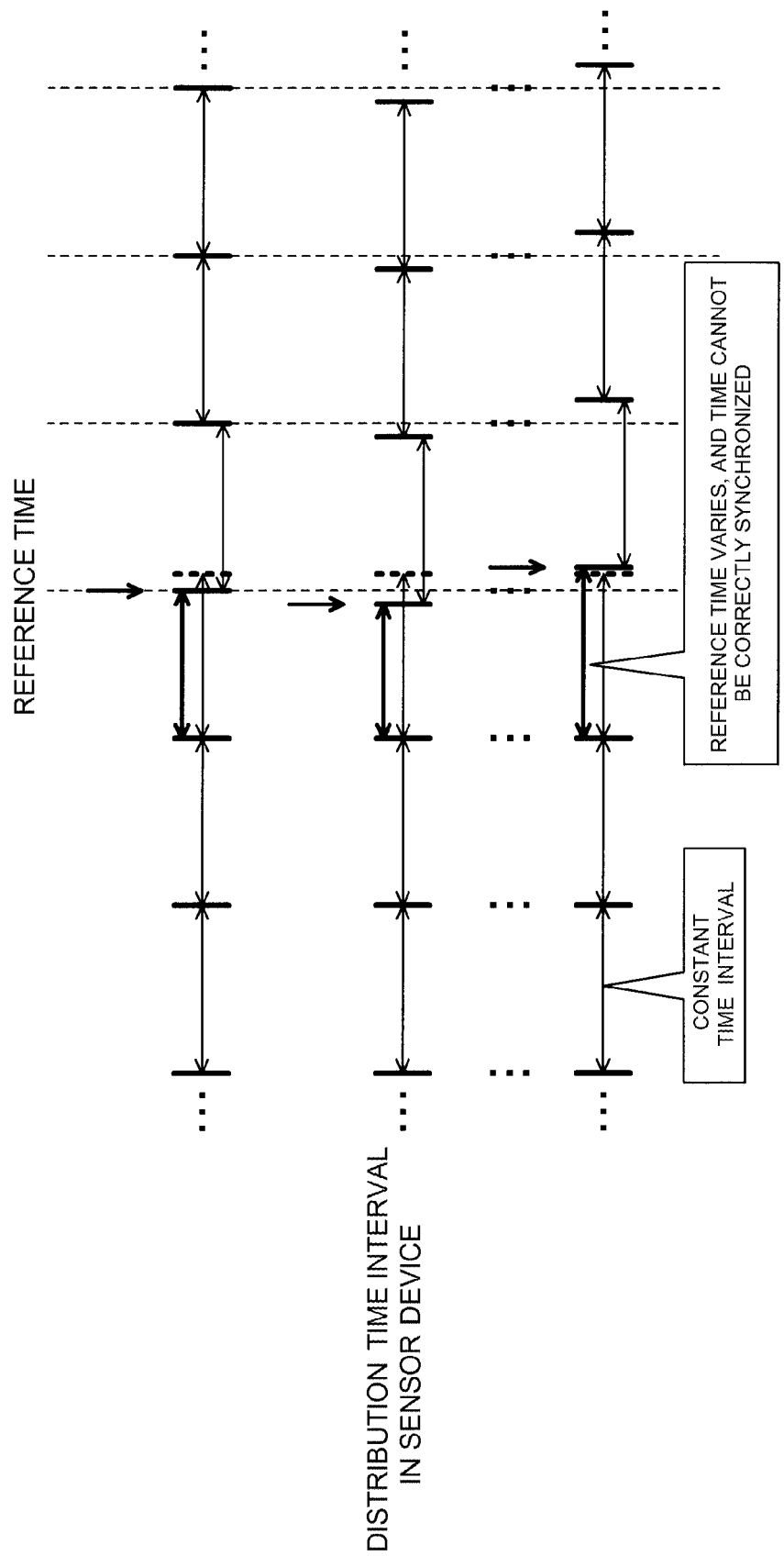
FIG. 15 is a timing chart showing before and after an adjustment of a local time according to a related art.

Meanwhile, FIG. 15 represents an existing example wherein the sensor device 200 acquires a reference time directly from the external server 300 or the like. As is clear from the drawing, the plurality of sensor devices acquire reference times from the external server 300 along individual paths. As a result of this, errors occur at the time synchronization interval or in the time itself.

Figure 22:
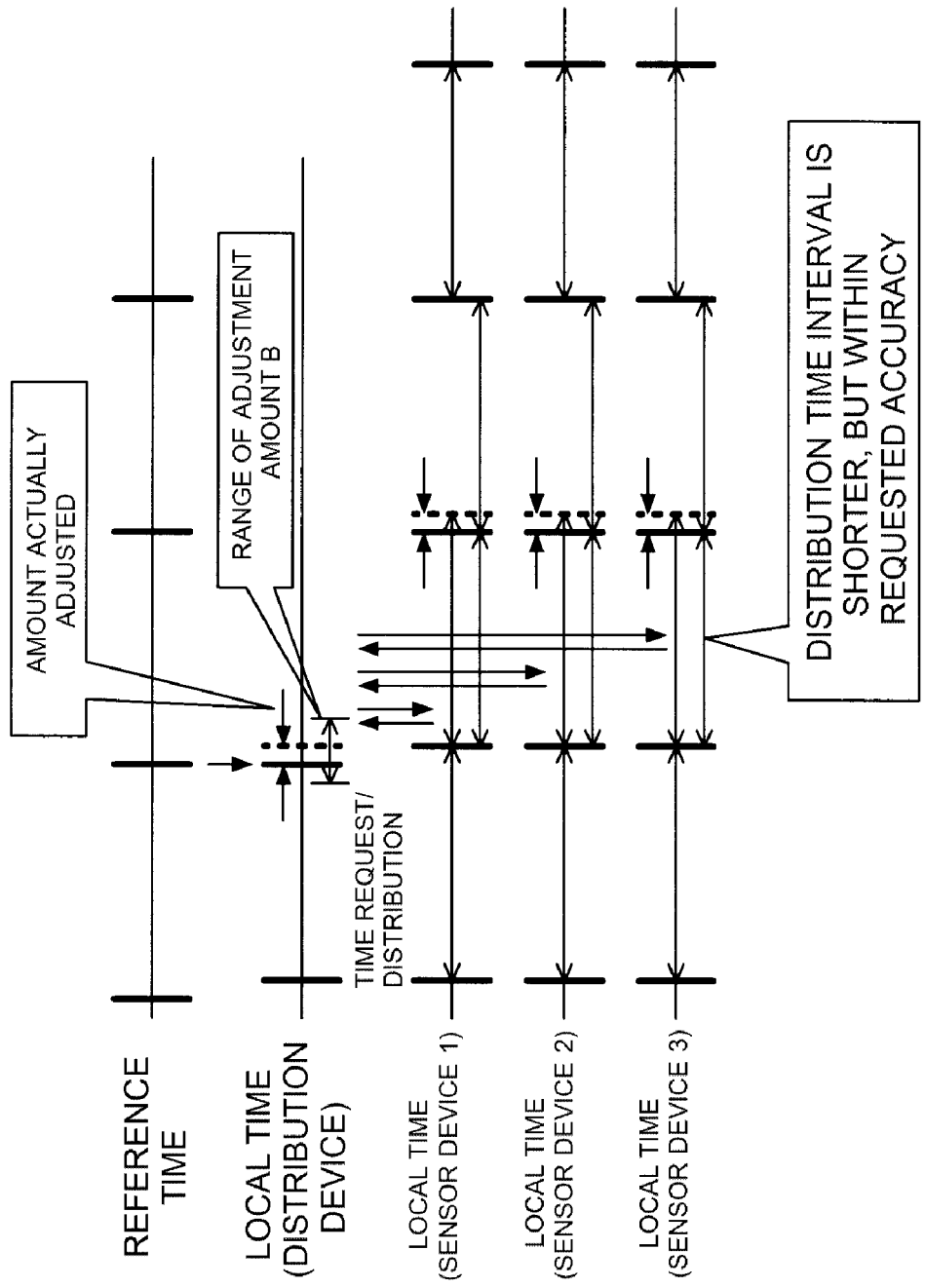
FIG. 22 is a diagram for describing an advantage of the invention.

FIG. 22 represents an aspect of time distribution when the distribution device 100 and sensor device carry out time synchronization using NTP. In the example of FIG. 11, the local time is distributed to each of sensor devices after the local time of the distribution device 100 is synchronized with the reference time. Meanwhile, in the example of FIG. 22, the distribution device 100 receives a time synchronization request from each of sensor devices after acquiring a reference time, and distributes time information to each of sensor devices. As heretofore described, the distribution device 100 or sensor device uses the time information after adjusting as appropriate considering a network propagation delay time or the like. Therefore, the sensor device can execute a measurement process at a stable time interval using the already widespread NTP.

6. Modification Examples

Next, using FIG. 16 and FIG. 17, a description will be given of modification examples of the invention.

Figure 16:
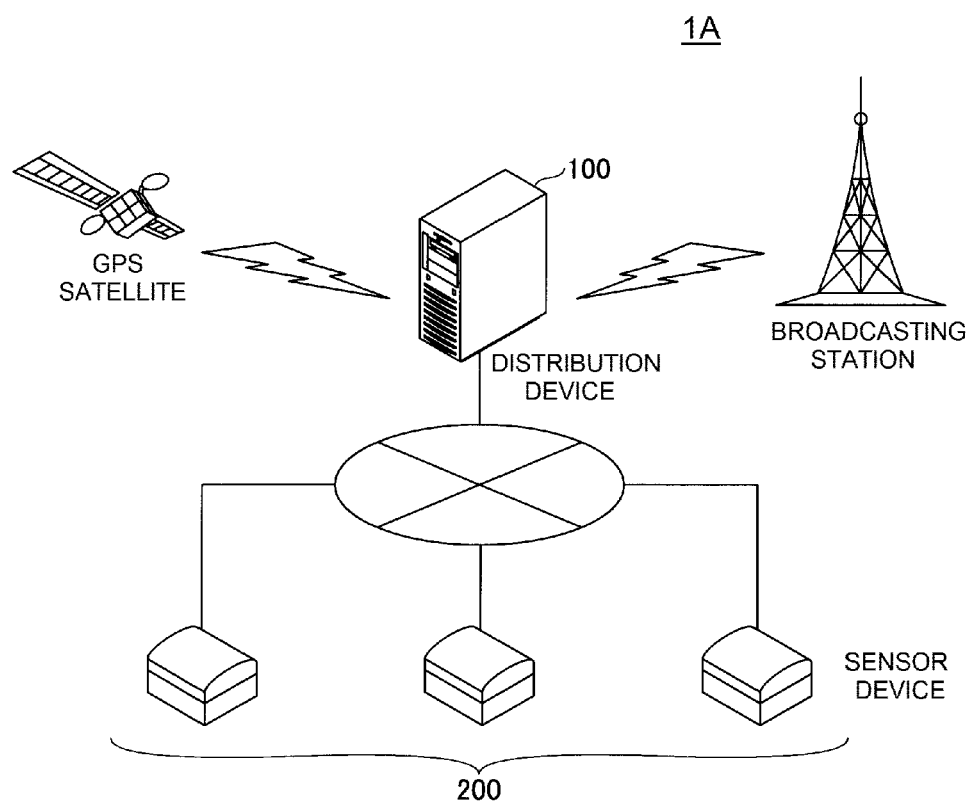
FIG. 16 is a diagram showing another configuration example of the distribution system according to an embodiment of the invention.

FIG. 16 shows a configuration example of a distribution system 1A differing from the distribution system 1 shown in FIG. 1. The distribution system 1A is such that, unlike the distribution system 1 of FIG. 1, the distribution device 100 acquires a reference time independently. Therefore, the distribution device 100 includes a GPS receiver or radio clock. By adopting this kind of configuration, the configuration of the distribution system can be simplified.

Figure 17:
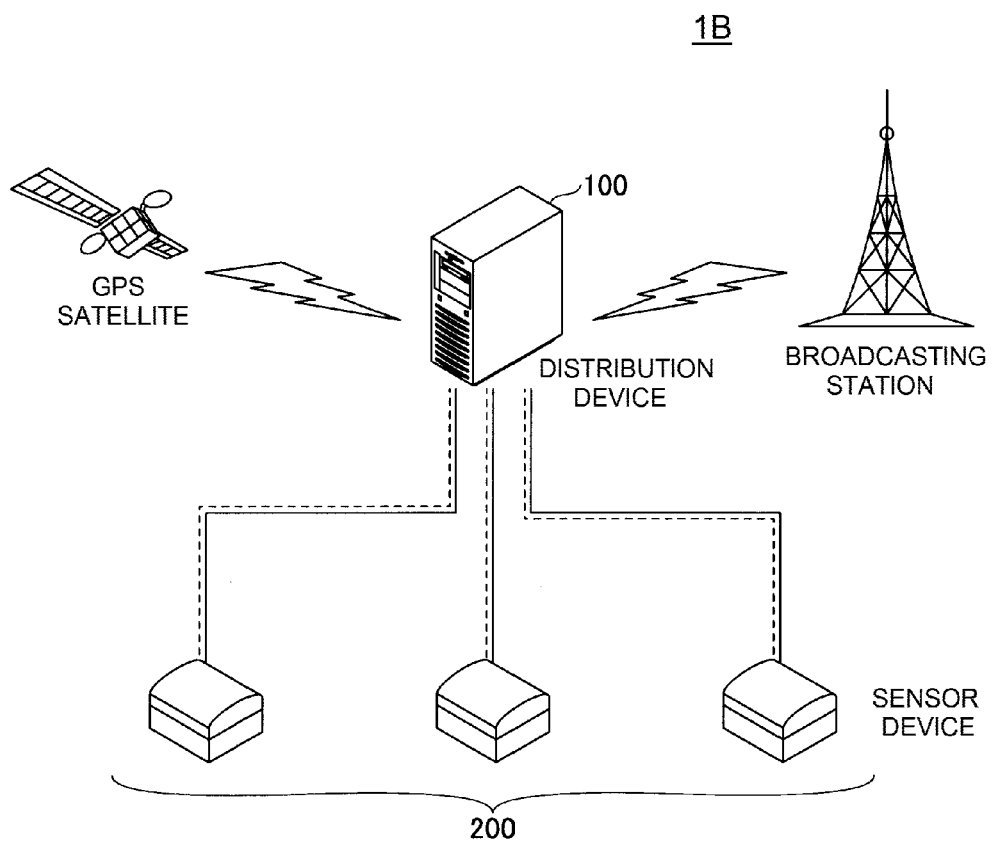
FIG. 17 is a diagram showing another configuration example of the distribution system according to an embodiment of the invention.

FIG. 17 shows a configuration example of a distribution system 1B differing from the distribution systems shown in FIG. 1 and FIG. 16. The distribution system 1B is such that, in the same way as the distribution system 1A shown in FIG. 16, the distribution device 100 can acquire a reference time independently. Meanwhile, the distribution device 100 and sensor device 200 of the distribution system 1B are connected by a signal line for transmitting a synchronous clock and a signal line for transmitting digital time information corresponding to the synchronous clock. In general, when distributing time as a digital value, the distribution is liable to be affected by variation in communication delay time, but when using a synchronous clock, the time can be distributed without being subject to that kind of delay.

7. Parameter Determination Method

Next, using FIG. 18 to FIG. 21, a description will be given of a method of determining the time interval T used when the distribution device 100 distributes time information and the adjustment amount B used when adjusting the local time. The time interval T and adjustment amount B are determined in accordance with the following method before the distribution device 100 and sensor device 200 are installed, and stored as time interval information and adjustment amount information in the time interval information storage unit and adjustment amount information storage unit respectively.

Firstly, using FIG. 18 and FIG. 19, a description will be given of a method of determining the time interval T and adjustment amount B. The adjustment amount B is determined based on an acceptable amount of error (error tolerance) of a synchronization interval during which the sensor device synchronizes a local time stored in the sensor device with the local time stored in the distribution device or an execution interval during which the sensor device performs a sensing operation. Further, the time interval T is determined based on at least any one of an acceptable amount of error in a length of a synchronization interval during which the sensor device synchronizes a local time of the sensor device with the local time of the distribution device or an execution interval during which the sensor device performs a sensing operation, an accuracy of a local time stored in the sensor device, and an accuracy of the local time stored in the distribution device. In the following example, the adjustment amount B is expressed as an adjustment amount B1 (a negative value, unit: seconds), which adjusts so as to delay the local time, and an adjustment amount B2 (a positive value, unit: seconds), which adjusts so as to advance the local time (|B1|=B2=B). Generally, however, the following expressions hold when adopting B1 as the minimum value of the adjustment amount range and B2 as the maximum value.

In step S301, when the measurement target (for example, the extent of vibration of a structure caused by an earthquake, or the like) of the sensor device 200 is determined by the user, the acceptable amount of error with respect to a length of the synchronization interval of the sensor device (or the acceptable amount of error in a length of the execution interval) is determined. Herein, the acceptable amount of error with respect to a length of the synchronization interval of the sensor device is expressed as A1 (unit: seconds) and A2 (unit: seconds). A1 is of a negative value, wherein |A1|=A2 (generally, however, the following expressions hold when adopting A1 as the minimum value and A2 as the maximum value of the acceptable amount of error).

In step S302, the adjustment amounts B1 and B2 are selected so as not to exceed the acceptable amounts of error A1 and A2 with respect to the length of the synchronization interval of the sensor device. The relationships between A1, A2, B1, and B2 are expressed by the following kinds of expression.

$$A1 \le B1 \le A2$$

$$A1 \le B2 \le A2$$

In theory, B1 and B2 are selected so that A1=B1 and A2=B2. However, as there is a possibility of further error being added due to other factors such as delay in the communication path or the process execution load, it is desirable that values providing a certain amount of leeway are selected so that, for example, B1=A1/5 and B2=A2/5.

In step S303, the accuracy of the local clock of the sensor device 200 is selected. The accuracy of the local clock of the sensor device 200 is determined in accordance with the performance of the RTC 25 mounted in the sensor device 200. The accuracy of the local clock is expressed as x1 (a negative value, unit: ppm (parts per million)) and x2 (a positive value, unit: ppm). Herein, x1 is taken to be a negative value and x2 a positive value for the sake of the description, but x1 and x2 may both be positive values or negative values.

In step S304, the time interval T in which the distribution device 100 distributes time information is determined. It is necessary that the time interval T is selected so that errors of the local clock of the sensor device 200 accumulated during the time interval T do not exceed the acceptable amount of error with respect to the length of the synchronization interval of the sensor device 200. Consequently, the time interval T is selected so as to satisfy the following expressions.

$$A1 \le T \cdot x1/1000000 \le A2$$

$$A1 \le T \cdot x2/1000000 \le A2$$

In step S305, when T selected in step S304 is a value appropriate to the structure of the distribution system 1, the value is stored as time interval information in the time interval information storage unit 151. Meanwhile, when T selected in step S304 is not an appropriate value (the process load or network load will be too large when the time is distributed at the time interval T in the distribution system, or the like), the process returns to step S303, and the accuracy of the local clock and the time interval T are selected again.

The distribution device 100, by using the time interval T and adjustment amount B (B1 and B2) obtained using the heretofore described method, can carry out stable time distribution within the range of acceptable amount of error with respect to the length of the synchronization interval or the execution interval of the sensor device 200.

FIG. 19 shows an example of each parameter selected using the heretofore described method.

Figure 20:
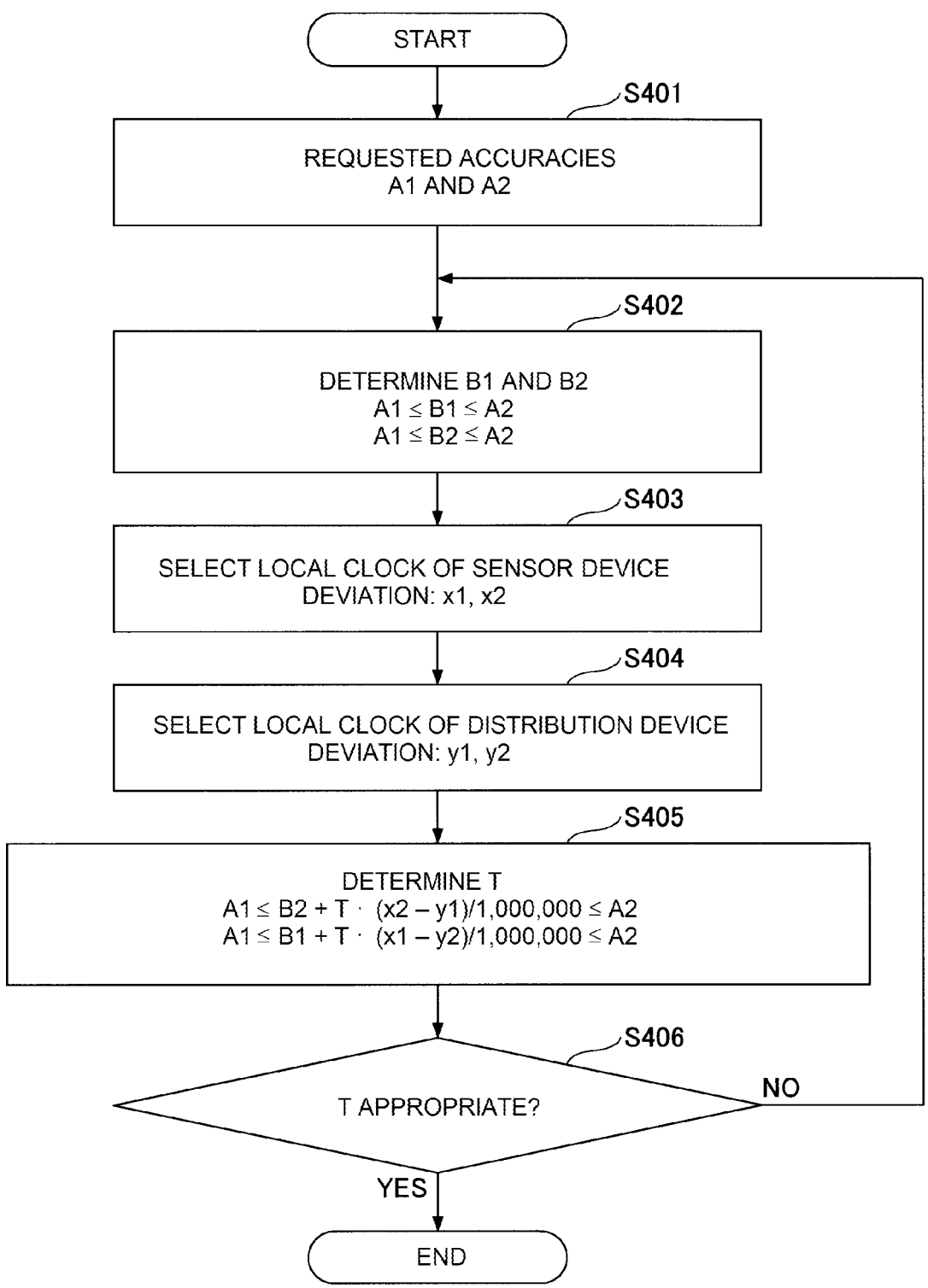
FIG. 20 is a flowchart showing a parameter determination process used according to the invention.

Next, using FIG. 20 and FIG. 21, a description will be given of a method of determining the time interval T and adjustment amount B, giving further consideration to the accuracy of the local time of the distribution device. In the following description, the accuracies A1 and A2 of the time of the sensor device 200, the adjustment amounts B1 and B2, and the accuracies x1 and x2 of the local clock of the sensor device 200, are as already described using FIG. 18 and FIG. 19.

Figure 18:
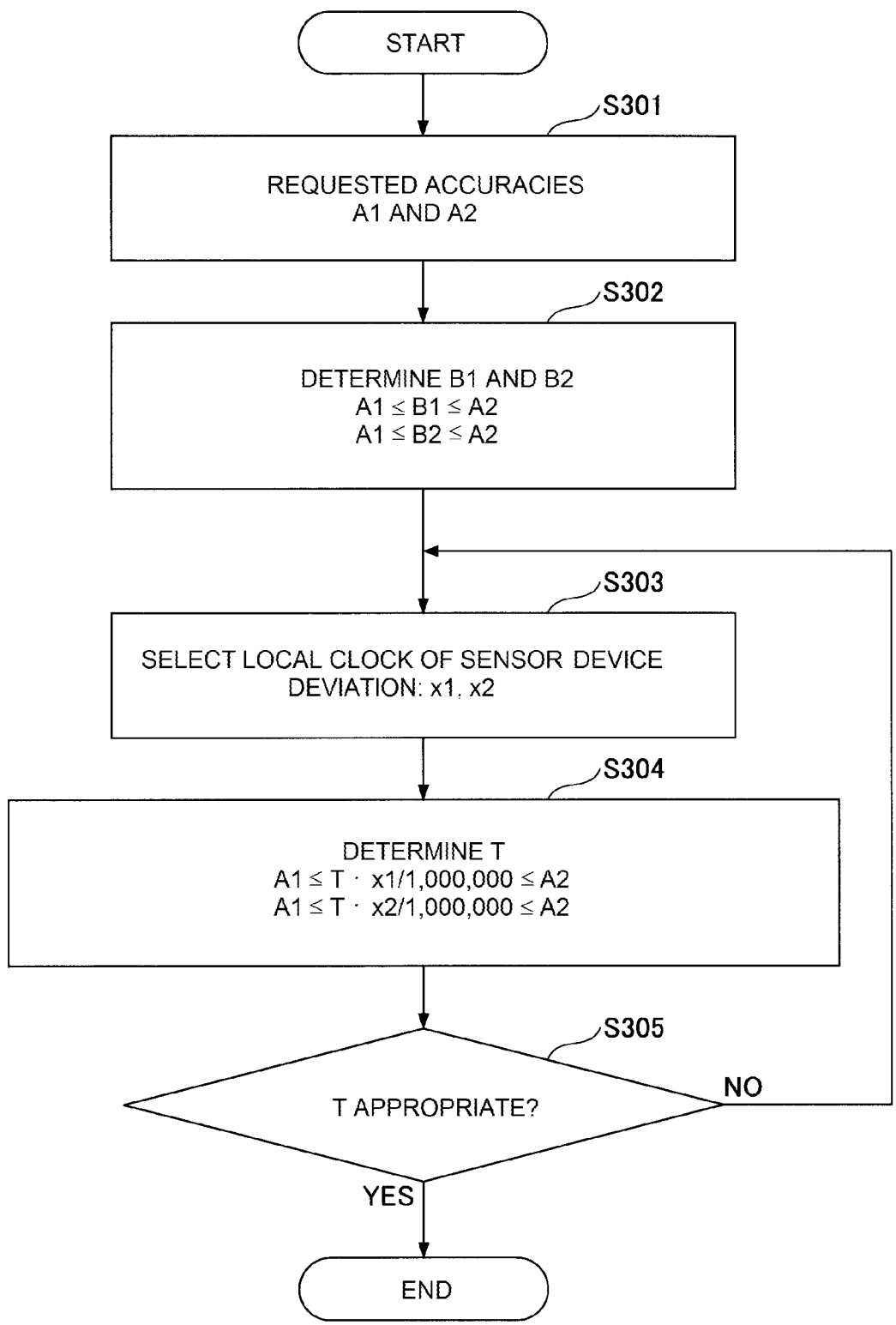
FIG. 18 is a flowchart showing a parameter determination process used according to the invention.

In step S401, in the same way as in step S301 of FIG. 18, the acceptable amounts of error A1 and A2 with respect to the synchronization interval of the sensor device (or the execution interval) are determined.

In step S402, in the same way as in step S302 of FIG. 18, the adjustment amounts B1 and B2 are selected.

In step S403, in the same way as in step S303 of FIG. 18, the accuracies x1 and x2 of the local clock of the sensor device 200 are selected.

In step S404, the accuracy of the local clock of the distribution device 100 is selected. The accuracy of the local clock of the distribution device 100 is determined in accordance with the performance of the RTC 16 mounted in the distribution device 100. The accuracy of the local clock is expressed as y1 (a negative value, unit: ppm) and y2 (a positive value, unit: ppm). Herein, y1 is taken to be a negative value and y2 a positive value for the sake of the description, but y1 and y2 may both be positive values or negative values.

In step S405, the time interval T in which the distribution device 100 distributes time information is determined. It is necessary that the time interval T is selected so that the sum of errors of the local clock of the distribution device 100 and errors of the local clock of the sensor device 200 does not exceed the acceptable amount of error with respect to the length of the synchronization interval of the sensor device 200 during the time interval T. Consequently, the time interval T is selected so as to satisfy the following expressions.

$$A1 \le B2 + T \cdot (x2-y1)/1000000 \le A2$$

$$A1 \le B1 + T \cdot (x1-y2)/1000000 \le A2$$

(x2−y1) and (x1−y2) express the sum of errors of the local clock of the distribution device 100 and errors of the local clock of the sensor device 200 (y1 and x1 are negative values).

In step S406, when T selected in step S405 is a value appropriate to the structure of the distribution system 1, the value is stored as time interval information in the time interval information storage unit 151. Meanwhile, when T selected in step S405 is not an appropriate value, the process returns to step S402, and the adjustment amounts B1 and B2, the accuracies x1, x2, y1, and y2 of the local clocks of the sensor device and distribution device, and the time interval T, are selected again.

The distribution device 100, by using the time interval T and adjustment amount B (B1 and B2) obtained using the heretofore described method, can more stably carry out time distribution within the range of acceptable amount of error with respect to the length of the synchronization interval or the execution interval of the sensor device 200.

FIG. 21 shows an example of each parameter selected using the heretofore described method.

The present international application claims priority from Japanese Patent Application No. 2013-123863, filed on Jun. 12, 2013, the whole of which is incorporated herein by reference.

What is claimed is:

1. A distribution device that distributes time information to at least one sensor device, the distribution device, comprising:
   a nonvolatile data storage medium that stores a time adjustment amount as a maximum unit of adjustment to be used for adjusting a local time;
   a hardware computing device that
      calculates a time difference between a reference time and the local time, and adjusts the local time by an amount equal to or less than the time adjustment amount, when the time difference is greater than the time adjustment amount, the time adjustment amount being determined based on an acceptable amount of error in a length of a synchronization interval during which the sensor device synchronizes a local time of the sensor device with the local time of the distribution device; and a network interface and control circuit that distributes time information of the adjusted local time to the sensor device.

2. The distribution device according to claim 1, wherein the nonvolatile data storage medium further stores time interval information of a time interval for distributing the time information to the sensor device, and the network interface and control circuit distributes the time information of the adjusted local time to the sensor device using the time interval information.

3. The distribution device according to claim 1, wherein the network interface and control circuit distributes the time information of the adjusted local time to the sensor device in response to a time distribution request transmitted from the sensor device in a predetermined time interval.

4. The distribution device according to claim 1, wherein the time adjustment amount is determined further based on an acceptable amount of error in a length of an execution interval during which the sensor device performs a sensing operation.

5. The distribution device according to claim 2, wherein the time interval is determined based on an acceptable amount of error in a length of a synchronization interval during which the sensor device synchronizes a local time of the sensor device with the local time of the distribution device or an execution interval during which the sensor device performs a sensing operation, and an accuracy of a local time of the sensor device.

6. The distribution device according to claim 2, wherein the time interval is determined based on an acceptable amount of error in a length of a synchronization interval during which the sensor device synchronizes a local time of the sensor device with the local time of the distribution device or an execution interval during which the sensor device performs a sensing operation, an accuracy of a local time of the sensor device, and an accuracy of the local time of the distribution device.

7. The distribution device according to claim 1, wherein the hardware computing device is configured to acquire the reference time from a GPS, NTP, radio clock, or atomic clock.

8. The distribution device according to claim 1, wherein the hardware computing device is configured to acquire the reference time from an external system.

9. The distribution device according to claim 1, wherein the network interface and control circuit distributes to the sensor device a synchronous clock and the time information corresponding to the synchronous clock.

10. The distribution device according to claim 1, wherein the sensor device includes an acceleration sensor, a displacement sensor, a strain sensor, or a temperature sensor.

11. The distribution device according to claim 1, wherein the hardware computing device, when the time difference calculated immediately after the distribution device is started up is greater than the time adjustment amount, adjusts the local time currently stored in the distribution device to the reference time.

12. The distribution device according to claim 1, wherein the hardware computing device, when the time difference is greater than a predetermined threshold that is greater than the time adjustment amount, adjusts the local time currently stored in the distribution device to the reference time without using the time adjustment amount.

13. The distribution device according to claim 1, wherein the hardware computing device is configured to acquire a reference time, and if the hardware computing device is unable to acquire the reference time, to transmit the time information of the local time without adjustment to the sensor device.

14. The distribution device according to claim 1, wherein the at least one sensor device includes a plurality of sensor devices, the nonvolatile data storage medium further stores time interval information of respective time intervals for distributing the time information to the plurality of sensor devices, and the network interface and control circuit distributes the time information of respective adjusted local times calculated for the plurality sensor devices using the respective time interval information.

15. The distribution device according to claim 1, wherein the at least one sensor device includes a plurality of sensor devices, and the network interface and control circuit receives a plurality of time distribution requests transmitted from the plurality of sensor devices during respective predetermined time intervals, and distributes the time information of respective adjusted local times calculated for the plurality of sensor devices.

16. The distribution device according to claim 1, wherein the hardware computing device adjusts the local time more than once by said amount equal to or less than the time adjustment amount until the adjusted local time is coincident with the reference time, when the time difference is greater than the time adjustment amount.

17. A distribution system comprising:

a sensor device; and a distribution device that distributes time information to the sensor device, the distribution device including a nonvolatile data storage medium that stores adjustment information of a time adjustment amount as a maximum unit of adjustment to be used for adjusting a local time, a hardware computing device that calculates a time difference between a reference time and the local time, and adjusts the local time by an amount equal to or less than the time adjustment amount, when the time difference is greater than the time adjustment amount, the time adjustment amount being determined based on an acceptable amount of error in a length of a synchronization interval during which the sensor device synchronizes a local time of the sensor device with the local time of the distribution device, and a network interface and control circuit that distributes time information of the adjusted local time to the sensor device, wherein the sensor device including a network interface and control circuit that receives the time information distributed from the network interface and control circuit, and a clock circuit that adjusts a local time of the sensor device so as to match the adjusted local time distributed from the distribution device.

18. The distribution system according to claim 17, wherein
- the sensor device includes a nonvolatile data storage medium that stores time interval information of a time interval during which the time information is distributed from the distribution device,
- the network interface and control circuit transmits a time distribution request to the network interface and control circuit of the distribution device based on the time interval, and
- the network interface and control circuit distributes the time information in response to the time distribution request.

19. A distribution method whereby time information is distributed to one or more sensor devices by a distribution device, the distribution method comprising:
- calculating a time difference between a local time of the distribution device and a reference time;
- adjusting the local time by an amount equal to or less than a time adjustment amount, the time adjustment amount being determined based on an acceptable amount of error in a length of a synchronization interval during which the sensor device synchronizes a local time of the sensor device with the local time of the distribution device; and
- distributing the time information of the adjusted local time to the one or more sensor devices at a predetermined time interval, the predetermined time interval is determined based on at least one of
  - said acceptable amount of error
  - the accuracy of a local time of the sensor device, and
  - the accuracy of the local time of the distribution device.

20. A distribution method according to claim 19, wherein, when the calculated time difference is greater than the time adjustment amount, the adjusting the local time includes adjusting the local time more than once by said amount equal to or less than the time adjustment amount until the adjusted local time is coincident with the reference time.

* * * * *